US010034053B1

(12) United States Patent
Trollope et al.

(10) Patent No.: US 10,034,053 B1
(45) Date of Patent: Jul. 24, 2018

(54) POLLS FOR MEDIA PROGRAM MOMENTS

(71) Applicant: GOOGLE LLC, Mountain View, CA (US)

(72) Inventors: Ingrid McAulay Trollope, London (GB); Ant Oztaskent, Surrey (GB); Yaroslav Volovich, Cambridge (GB)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/006,037

(22) Filed: Jan. 25, 2016

(51) Int. Cl.
| | |
|---|---|
| *H04H 60/56* | (2008.01) |
| *H04N 21/466* | (2011.01) |
| *H04H 60/33* | (2008.01) |
| *H04N 7/173* | (2011.01) |
| *H04H 60/40* | (2008.01) |

(Continued)

(52) U.S. Cl.
CPC ........ *H04N 21/4667* (2013.01); *H04H 60/33* (2013.01); *H04H 60/40* (2013.01); *H04H 60/46* (2013.01); *H04N 7/17309* (2013.01); *H04N 21/252* (2013.01); *H04N 21/25891* (2013.01); *H04N 21/44222* (2013.01);
(Continued)

(58) Field of Classification Search
CPC ............. H04N 21/4667; H04N 21/252; H04N 21/25891; H04N 21/44222; H04N 21/4755; H04N 21/4758; H04N 21/4788; H04N 60/33; H04N 60/40; H04N 60/46
See application file for complete search history.

(56) References Cited

U.S. PATENT DOCUMENTS 6,317,882 B1  11/2001 Robbins
6,934,963 B1   8/2005 Reynolds et al.
(Continued)

FOREIGN PATENT DOCUMENTS

WO  WO 2001/03008 A1  1/2001
WO  WO 2011/069035 A1  6/2011
(Continued)

OTHER PUBLICATIONS

Google Inc., International Search Report and Written Opinion, PCT/US2015/036819, dated Oct. 6, 2015, 8 pgs.
(Continued)

*Primary Examiner* — Yassin Alata
(74) *Attorney, Agent, or Firm* — Morgan, Lewis & Bockius LLP

(57) ABSTRACT

A method at a computer system includes: receiving a request from a user device for presenting a poll based on a broadcast program being viewed by a user of the user device, the request corresponding to a triggering event detected by the user device, the triggering event being initiated by the user on the user device; receiving from electronic devices search queries related to the broadcast program; identifying automatically popular moments of the broadcast program based on at least a corresponding history of search queries related to the broadcast program including the received search queries related to the broadcast program; generating a poll including one or more questions related to the broadcast program, the questions being populated based on the popular moments; and sending the generated poll to the user device configured for display by the user device, wherein the poll is configured to be actionable by the user.

20 Claims, 12 Drawing Sheets

(51) Int. Cl.
*H04H 60/46* (2008.01)
*H04N 21/25* (2011.01)
*H04N 21/258* (2011.01)
*H04N 21/442* (2011.01)
*H04N 21/475* (2011.01)
*H04N 21/4788* (2011.01)

(52) U.S. Cl.
CPC ..... *H04N 21/4755* (2013.01); *H04N 21/4758* (2013.01); *H04N 21/4788* (2013.01)

(56) References Cited

U.S. PATENT DOCUMENTS

| | | | |
|---|---|---|---|
| 7,209,942 | B1 | 4/2007 | Hori et al. |
| 7,281,220 | B1 | 10/2007 | Rashkovskiy |
| 7,367,043 | B2 | 4/2008 | Dudkiewicz et al. |
| 7,983,915 | B2 | 7/2011 | Knight et al. |
| 8,010,988 | B2 | 8/2011 | Cox |
| 8,122,094 | B1 | 2/2012 | Kotab |
| 8,132,103 | B1 | 3/2012 | Chowdhury et al. |
| 8,370,380 | B1 | 2/2013 | Kuraoka et al. |
| 8,433,431 | B1 | 4/2013 | Master et al. |
| 8,433,577 | B2 | 4/2013 | Sharifi et al. |
| 8,447,604 | B1 | 5/2013 | Chang |
| 8,478,750 | B2 | 7/2013 | Rao et al. |
| 8,484,203 | B1 | 7/2013 | Clancy et al. |
| 8,516,533 | B2 | 8/2013 | Davis et al. |
| 8,572,488 | B2 | 10/2013 | Phillips et al. |
| 8,607,276 | B2 | 12/2013 | Chang et al. |
| 8,645,125 | B2 | 2/2014 | Liang et al. |
| 8,707,381 | B2 | 4/2014 | Polumbus et al. |
| 8,751,502 | B2 | 6/2014 | Agrawal |
| 8,868,558 | B2 | 10/2014 | Bianco et al. |
| 8,989,521 | B1 | 3/2015 | Ho et al. |
| 8,994,311 | B1 * | 3/2015 | Lynch ................ G06F 17/3082 318/565 |
| 9,135,291 | B2 | 9/2015 | Assam |
| 9,173,001 | B1 | 10/2015 | Roberts et al. |
| 9,282,075 | B2 | 3/2016 | Smalley et al. |
| 9,317,500 | B2 | 4/2016 | Hwang |
| 2003/0093790 | A1 | 5/2003 | Logan et al. |
| 2003/0135490 | A1 | 7/2003 | Barrett et al. |
| 2004/0004599 | A1 | 1/2004 | Shepard et al. |
| 2006/0004871 | A1 | 1/2006 | Hayama et al. |
| 2007/0130580 | A1 | 6/2007 | Covell et al. |
| 2007/0244902 | A1 | 10/2007 | Seide et al. |
| 2008/0086742 | A1 * | 4/2008 | Aldrey ................ H04H 60/33 725/24 |
| 2008/0148320 | A1 | 6/2008 | Howcroft |
| 2008/0270449 | A1 | 10/2008 | Gossweiler et al. |
| 2008/0275764 | A1 | 11/2008 | Wilson et al. |
| 2008/0306807 | A1 | 12/2008 | Amento et al. |
| 2009/0055385 | A1 | 2/2009 | Jeon et al. |
| 2009/0083281 | A1 | 3/2009 | Sarig et al. |
| 2009/0254823 | A1 | 10/2009 | Barrett |
| 2011/0063503 | A1 | 3/2011 | Brand et al. |
| 2011/0066961 | A1 | 3/2011 | Wang et al. |
| 2011/0078020 | A1 | 3/2011 | LaJoie et al. |
| 2011/0137920 | A1 | 6/2011 | Cohen et al. |
| 2011/0173194 | A1 | 7/2011 | Sloo et al. |
| 2011/0218946 | A1 | 9/2011 | Stern et al. |
| 2011/0246383 | A1 | 10/2011 | Gibson et al. |
| 2011/0289532 | A1 | 11/2011 | Yu et al. |
| 2012/0131060 | A1 | 5/2012 | Heidasch |
| 2012/0150907 | A1 | 6/2012 | Chowdhury et al. |
| 2012/0189273 | A1 | 7/2012 | Folgner et al. |
| 2012/0278331 | A1 | 11/2012 | Campbell et al. |
| 2012/0311624 | A1 | 12/2012 | Oskolkov et al. |
| 2013/0006627 | A1 | 1/2013 | Guthery et al. |
| 2013/0111514 | A1 | 5/2013 | Slavin et al. |
| 2013/0149689 | A1 | 6/2013 | DeGross |
| 2013/0160038 | A1 | 6/2013 | Slaney et al. |
| 2013/0170813 | A1 | 7/2013 | Woods et al. |
| 2013/0185711 | A1 | 7/2013 | Morales |
| 2013/0291019 | A1 | 10/2013 | Burkitt et al. |
| 2013/0311408 | A1 | 11/2013 | Bagga et al. |
| 2013/0325869 | A1 * | 12/2013 | Reiley ................ G06F 17/3002 707/741 |
| 2013/0326406 | A1 | 12/2013 | Reiley et al. |
| 2014/0067825 | A1 | 3/2014 | Oztaskent et al. |
| 2014/0161416 | A1 * | 6/2014 | Chou ................ H04N 5/91 386/241 |
| 2014/0200888 | A1 | 7/2014 | Liu et al. |
| 2014/0280686 | A1 | 9/2014 | Herlein |
| 2014/0280879 | A1 | 9/2014 | Skolicki |
| 2015/0067061 | A1 | 3/2015 | Poston |
| 2015/0149482 | A1 | 5/2015 | Finkelstein |
| 2015/0170325 | A1 | 6/2015 | Abecassis et al. |
| 2015/0229982 | A1 | 8/2015 | Scott |
| 2015/0339382 | A1 | 11/2015 | Skolicki |
| 2015/0347903 | A1 | 12/2015 | Saxena et al. |
| 2016/0037222 | A1 | 2/2016 | Lewis et al. |
| 2016/0042766 | A1 | 2/2016 | Kummer |

FOREIGN PATENT DOCUMENTS

| | | |
|---|---|---|
| WO | WO 2012/166739 A2 | 12/2012 |
| WO | WO 2013/037081 A1 | 3/2013 |
| WO | WO 2014/035554 A1 | 3/2014 |
| WO | WO 2015/196115 A1 | 12/2015 |

OTHER PUBLICATIONS

Google Inc., International Search Report and Written Opinion, PCT/US2015/036756, dated Oct. 6, 2015, 8 pgs.
Google Inc., International Search Report and Written Opinion, PCT/US2016/062586, dated Jan. 30, 2017, 11 pgs.
Google, IPRP PCT/US2015036756, dated Dec. 20, 2016, 6 pgs.
Google, IPRP PCT/US2015036819, dated Dec. 20, 2016, 6 pgs.
Google Inc., International Search Report and Written Opinion, PCT/US2017/014737, dated Mar. 2, 2017, 11 pgs.

* cited by examiner

POLLS FOR MEDIA PROGRAM MOMENTS

RELATED APPLICATIONS

This application is related to U.S. application Ser. No. 15/006,008, titled "Media Program Moments Guide," filed Jan. 25, 2016, which is incorporated by reference herein in its entirety.

TECHNICAL FIELD

The present application describes systems and methods for identifying moments in media programs that users are interested in and presenting these moments.

BACKGROUND

With the proliferation of choices in media content, such as television programs and movies, consumers of media content have more choices than ever for their enjoyment. However, the cornucopia of choices can also be overwhelming for a consumer. The process of finding interesting or popular content, of separating out the wheat from the chaff, is becoming more time-consuming and tedious. Furthermore, as media content are talked about in social networks and the wider culture, the process of finding the interesting, popular, or engaging media moments that are being talked about is also becoming time-consuming and tedious.

SUMMARY

In accordance with some implementations, methods, systems, and computer readable storage media are provided to identify media content moments. In accordance with some implementations, a method at a computing system includes detecting a search event corresponding to a spike in search volume above a predefined threshold for a set of related queries, identifying a respective broadcast media program and a respective moment of the respective media program associated in time with the search event, generating a presentation that includes the identified media program and the identified moment associated with the search event, and in response to a request issued by a client device for media program information, transmitting the presentation to the client device for display.

In accordance with some implementations, a computer system includes one or more processors, memory, and one or more programs, where the one or more programs are stored in the memory and configured to be executed by the one or more processors. The one or more programs include instructions for detecting a search event corresponding to a spike in search volume above a predefined threshold for a set of related queries, identifying a respective broadcast media program and a respective moment of the respective media program associated in time with the search event, generating a presentation that includes the identified media program and the identified moment associated with the search event, and in response to a request issued by a client device for media program information, transmitting the presentation to the client device for display.

In accordance with some implementations, a non-transitory computer readable storage medium stores one or more programs. The one or more programs include instructions which, when executed by a computer system with one or more processors, cause the computer system to detect a search event corresponding to a spike in search volume above a predefined threshold for a set of related queries, identify a respective broadcast media program and a respective moment of the respective media program associated in time with the search event, generate a presentation that includes the identified media program and the identified moment associated with the search event, and in response to a request issued by a client device for media program information, transmit the presentation to the client device for display.

In accordance with some implementations, methods, systems, and computer readable storage media are provided to generate polls associated with media content moments. In accordance with some implementations, a method at a computer system includes receiving a first request from a user device for presenting a poll based on a broadcast program being viewed by a user of the user device, the first request corresponding to a triggering event detected by the user device, the triggering event being initiated by the user on the user device; receiving from a plurality of electronic devices search queries related to the broadcast program; identifying automatically one or more popular moments of the broadcast program based on at least: content of the broadcast program, and a corresponding history of search queries related to the broadcast program submitted to the computer system including the received search queries related to the broadcast program; generating a poll including one or more questions related to the broadcast program, the one or more questions being populated based on the one or more popular moments; and sending the generated poll to the user device configured for display by the user device, wherein the poll is configured to be actionable by the user of the user device.

In accordance with some implementations, a computer system includes one or more processors, memory, and one or more programs, where the one or more programs are stored in the memory and configured to be executed by the one or more processors. The one or more programs include instructions for receiving a first request from a user device for presenting a poll based on a broadcast program being viewed by a user of the user device, the first request corresponding to a triggering event detected by the user device, the triggering event being initiated by the user on the user device; receiving from a plurality of electronic devices search queries related to the broadcast program; identifying automatically one or more popular moments of the broadcast program based on at least: content of the broadcast program, and a corresponding history of search queries related to the broadcast program submitted to the computer system including the received search queries related to the broadcast program; generating a poll including one or more questions related to the broadcast program, the one or more questions being populated based on the one or more popular moments; and sending the generated poll to the user device configured for display by the user device, where the poll is configured to be actionable by the user of the user device.

In accordance with some implementations, a non-transitory computer readable storage medium stores one or more programs. The one or more programs include instructions which, when executed by a computer system with one or more processors, cause the computer system to receive a first request from a user device for presenting a poll based on a broadcast program being viewed by a user of the user device, the first request corresponding to a triggering event detected by the user device, the triggering event being initiated by the user on the user device; receive from a plurality of electronic devices search queries related to the broadcast program; identify automatically one or more popular moments of the broadcast program based on at least:

content of the broadcast program, and a corresponding history of search queries related to the broadcast program submitted to the computer system including the received search queries related to the broadcast program; generate a poll including one or more questions related to the broadcast program, the one or more questions being populated based on the one or more popular moments; and send the generated poll to the user device configured for display by the user device, where the poll is configured to be actionable by the user of the user device.

BRIEF DESCRIPTION OF THE DRAWINGS

Like reference numerals refer to corresponding parts throughout the drawings.

DESCRIPTION OF IMPLEMENTATIONS

The methods and systems described herein disclose systems and methods for identifying and presenting popular or interesting moments in media content and to generate polls related to moments in media content. Such methods and systems provide an effective way for a consumer of media content to see which media content and media content moments with which users are engaged.

Reference will now be made in detail to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

Figure 1A:
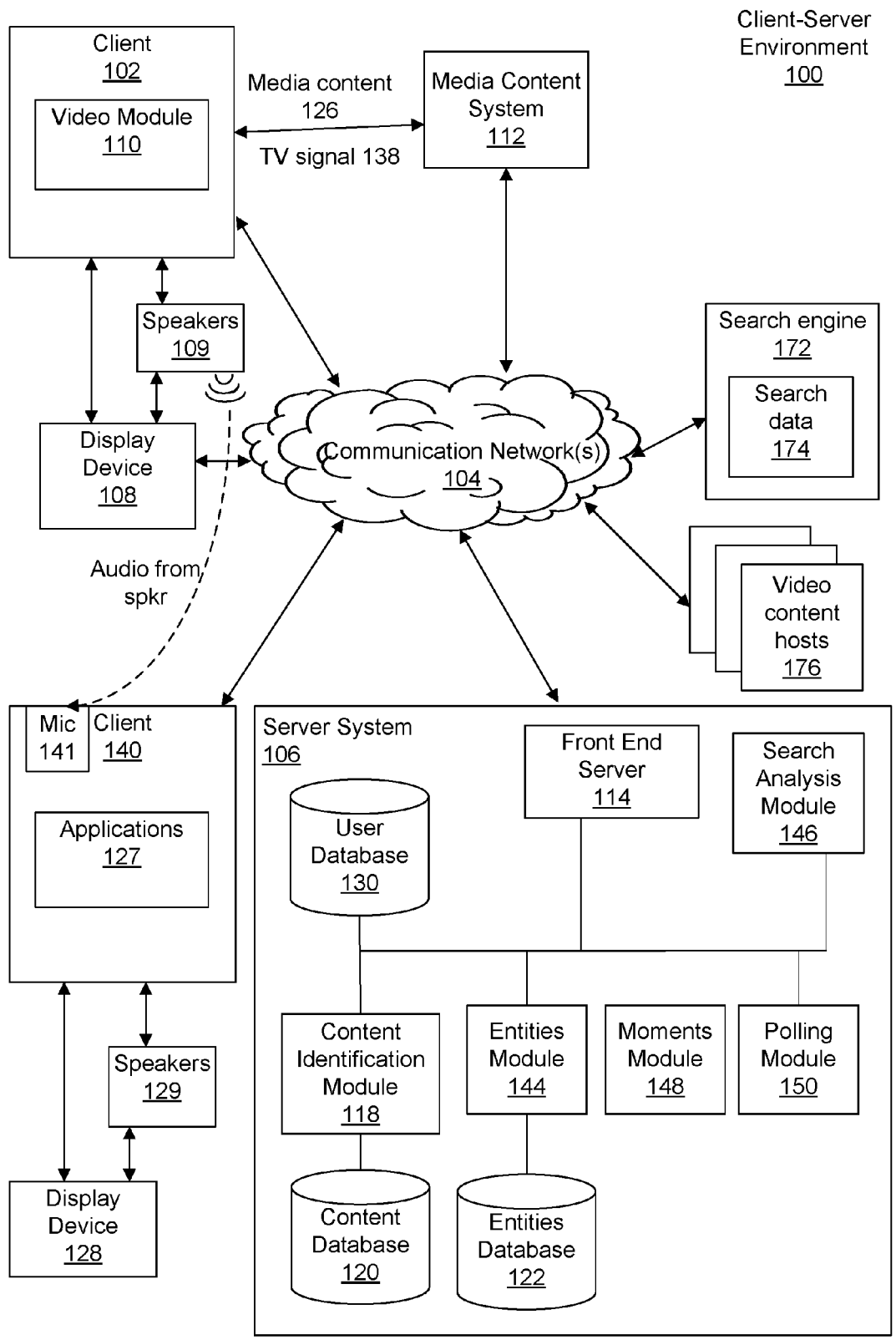
FIGS. 1A-1B are block diagrams illustrating distributed client-server systems in accordance with some implementations.

FIG. 1A is a block diagram illustrating a client-server environment in accordance with some implementations. The client-server environment 100 includes a client device 102, a client device 140, one or more communication networks 104, a server system 106, a video content system 112, a search engine 172, and optionally one or more video content hosts 176. The communication network(s) 104 communicatively couples the server system 106, the client device 102, the client device 140, the video content system 112, search engine 172, and video content hosts 176.

In some implementations, the server system 106 is implemented as a single server system, while in other implementations the server system 106 is implemented as a distributed system of multiple servers. Solely for convenience of explanation, the server system 106 is described below as being implemented on a single server system. In some implementations, the media content system 112 is implemented as a single server system, while in other implementations the media content system 112 is implemented as a distributed system of multiple servers. Solely, for convenience of explanation, the media content system 112 is described below as being implemented on a single server system. In some implementations, the functionality of the media content system 112 or the server system 106 are combined into one server system. In some implementations, the server system 106 includes the search engine 172.

The communication network(s) 104 can be any wired or wireless local area network (LAN) and/or wide area network (WAN), such as an intranet, an extranet, or the Internet. It is sufficient that the communication network 104 provides communication capability between the client devices 102 and 140, the server system 106, the media content system 112, the search engine 172, and the video content hosts 176. In some implementations, the communication network 104 uses the HyperText Transport Protocol (HTTP) to transport information using the Transmission Control Protocol/Internet Protocol (TCP/IP). HTTP permits client devices 102 and 140 to access various resources available via the communication network 104. The various implementations described herein, however, are not limited to the use of any particular protocol.

The client device 102 is any suitable computer device that, in some implementations, is capable of connecting to the communication network 104, receiving media content or media program 126 (e.g., a media content item with video and/or audio content), extracting information from the media content item 126, and presenting the media content item 126 on the display device 108 and/or through speaker(s) 109. In some implementations, the client device 102 is a set top box that includes components to receive and present video streams. For example, the client device 102 can be a set top box for receiving cable TV and/or satellite TV, a digital video recorder (DVR), a digital media receiver, a TV tuner, a computer, and/or any other device that outputs TV signals. In some other implementations, the client device 102 is a computer, laptop computer a tablet device, a netbook, a mobile phone, a smartphone, tablet device, a gaming device, a multimedia player device, or any other device that is capable of receiving media content 126 (e.g., as video streams through the network 104). In some implementations, the client device 102 displays a video stream on the display device 108. In some implementations the client device 102 is a conventional TV display that is not connected to the Internet and that displays digital and/or analog TV content via over the air broadcasts or a satellite or cable connection.

In some implementations, the display device 108 is any display for presenting video content to a user. In some implementations, the display device 108 is the display of a television, or a computer monitor, that is configured to receive and display video signals or other digital content from the client 102 device. In some other implementations, the display device 108 is an electronic device with a central processing unit, memory and a display that is configured to receive and display video signals or other digital content form the client device 102. In some further implementations, the display device 108 is a display component of an electronic device with a central processing unit and memory. For example, the display device can be a LCD screen or a CRT screen of a device (e.g., a tablet device, a mobile telephone, smartphone, a desktop computer, a laptop computer). As another example, the display device may be a projector or other type of video display system. The display 108 can be coupled to the client device 102 via a wireless or wired connection (e.g., a video cable). In some implementations, the display device 108 includes one or more audio speakers for outputting audio content corresponding to the video content (e.g., the audio content of a video).

In some implementations, the client device 102 includes a video module 110 that receives media content 126 from the media content system 112 or elsewhere, extracts content information from the media content 126 (e.g., a video stream, a video file) that is playing on the client device 102 and sends the content information to the server 106. In some implementations, the client device 102 includes a similar module for audio-only media content and for audio components of media content (e.g., the audio content of a video stream or video file) and/or a similar module for metadata associated with the media content item 126.

In some implementations, the client device 102 receives video content 126 via a TV signal 138. As used herein, a TV signal is an electrical, optical, or other type of data transmitting medium that includes audio and/or video components corresponding to a TV channel. In some implementations, the TV signal 138 is a terrestrial over-the-air TV broadcast signal or a signal distributed/broadcast on a cable system or a satellite system. In some implementations, the TV signal 138 is transmitted as data over a network connection. For example, the client device 102 can receive video streams from an Internet connection. Audio and video components of a TV signal are sometimes referred to herein as audio signals and video signals. In some implementations, a TV signal corresponds to a TV channel that is being displayed on the display device 108.

In some implementations, the media content item 126 is live television content (e.g., first-run television content, live events shown on television). In some implementations, the video content 126 is previously shown content (e.g., a re-run shown on a broadcast or non-broadcast channel, a later showing of content to accommodate time zone differences). In some implementations, the video content 126 is recorded content (e.g., content recorded in and played back from a DVR; content fully downloaded to and stored in, and played back from, non-volatile memory). In some implementations, the video content is streaming content (e.g. online video).

In some implementations, the media content item 126 includes audible sound or content (e.g., audio content). The audible sound or content includes audible verbal information or content (e.g., spoken dialogue or speech, music with lyrics), and optionally audible non-verbal information or content (e.g., tones, sound effects, music without lyrics). In some implementations, the audible sound is carried in an audio track in the media content item 126. In some implementations, a TV signal carries information for audible sound corresponding to an audio track on a TV channel. In some implementations, the audible sound is produced by speaker(s) associated with the display device 108 or the client device 102 (e.g. speaker(s) 109). In some implementations, the media content item 126 also includes audio (e.g., tones) that is not audible to the human ear (i.e., sounds having a frequency outside of the frequency range for human-audible sound) but which carries information (e.g., program information, broadcaster information) encoded within.

In some implementations, the media content item 126 includes information or data for subtitles or captions (e.g., closed captions) that correspond to audible verbal information (e.g., spoken speech, spoken monologue and/or dialogue, song lyrics) in the audio track. The subtitles or captions are a textual transcription of verbal information in the media content item. The subtitles or captions can be presented concurrently with the corresponding video content. For convenience, subtitles and captions are hereinafter referred to collectively as "subtitles," and subtitles/captions data as "subtitles data." The subtitles data may be, for example, carried in the TV signal or the data file or stream corresponding to the media content item 126.

In some implementations, the media content item 126 includes metadata that provides information about the media content item 126. The metadata may include, for example, a title or name of the media content item, information regarding the artist(s), creator(s), producer(s), distributor(s), and/or publisher(s) of the media content item 126, a description of the media content item 126, genre or category, one or more tags or labels, and technical information associated with the media content item 126 (e.g., encoding format and quality, native resolution, length of time, etc.).

The client device 140 may be any suitable computer device that is capable of connecting to the communication network 104, such as a computer, a laptop computer, a tablet device, a netbook, an internet kiosk, a personal digital assistant, a mobile phone, a gaming device, or any other device that is capable of communicating with the server system 106. The client device 140 typically includes one or more processors, non-volatile memory such as a hard disk drive, and a display. The client device 140 may also have input devices such as a keyboard and a mouse (as shown in FIG. 3B). In some implementations, the client device 140 includes a touch screen display.

In some implementations, the client device 140 is connected or coupled to a display device 128. The display device 128 can be any display for presenting video content to a user. In some implementations, the display device 128 is the display of a television, or a computer monitor, that is configured to receive and display video signals or other digital content from the client 128. In some other implementations, the display device 128 is an electronic device with a central processing unit, memory and a display that is configured to receive and display video signals or other digital content from the client 140. In some further implementations, the display device 128 is a display component of an electronic device with a central processing unit and memory. For example, the display device can be a LCD screen or a CRT screen of a device (e.g., a tablet device, a mobile telephone, smartphone, a desktop computer, a laptop computer). As another example, the display device may be a tablet device, a mobile phone, multimedia device, projector or other type of video display system. In some implementations, the display device 128 includes, or is otherwise coupled to, one or more audio speakers for outputting audio content corresponding to the video content (e.g., the audio content of a video).

In some implementations, the client device 140 is connected to the client device 102 via a wireless or wired connection. In some implementations where such connection exists, the client device 140 optionally operates in accordance with instructions, information and/or digital content (collectively second screen information) provided by the client device 102. In some implementations, the client device 102 issues instructions to the client device 140 that cause the client device 140 to present on the display 128 and/or the speaker(s) 129 content that is complementary to, or related to, content that is being presented by the client 102 on the display 108 and/or speaker(s) 109. In some other implementations, the server 106 issues instructions to the client device 140 that cause the client device 140 to present on the display 128 and/or the speaker(s) 129 content that is complementary to, or related to, content that is being presented by the client 102 on the display 108 and/or the speaker(s) 109.

In some implementations, the client device 140 includes a microphone 141 that enables the client device 140 to receive sounds (e.g., audio content, including human-audible content (e.g., speech, music) and human-inaudible content (e.g., inaudible tones)) from the client device 102 output through speaker(s) 109, as the client device 102 plays the media content item 126. The microphone 141 enables the client device 140 to capture and optionally store the audio content or soundtrack that is associated with the media content item 126 as the audio content/soundtrack is being output. In the same manner as described herein for the client 102, the client device 140 can store this information locally and then send to the server 106 content information that is any one or more of: fingerprints of the stored audio content, the audio content itself, portions/snippets of the audio content, or fingerprints of the portions of the audio content. In this way, the server 106 can identify the media content item 126 being played on client device 102 even if the client device 102 on which the media content item 126 is being played is not an Internet-enabled device, such as a television set lacking network connectivity a device not connected to the Internet (temporarily or permanently) and therefore unable to send the content information, or a device that does not have the capability to record or fingerprint media information related to the media content item 126. Such an arrangement (i.e., where the client device 140 stores and sends the content information to the server 106) allows a user to receive from the server 106 second screen content triggered in response to the content information no matter where the viewer is consuming media content 126 and information related to the media content item 126, such as information related to entities in the media content item 126.

In some implementations, the microphone 141 also enables the client device 140 to receive voice inputs from the user. The voice inputs include, for example, commands to perform particular operations, and queries or requests for information or content. In some implementations, content information for media content 126 playing at the client 102 is sent for identification in response to user input (e.g., a user command or request for information or an automatically generated poll related to the media content 126).

In some implementations, the content information sent to the server 106 from either client device 102 or 140 includes any one or more of: fingerprints of the stored subtitles data, the subtitles data itself, portions/snippets of the subtitles data, or fingerprints of the portions of the subtitles data. In this way, the server 106 can identify the media content item 126 being played on the client device 102 even if, for example, the volume level on the client device 102 is too low for the audio content to be audibly captured by the client device 140, the audio content as output by the client device 102 is distorted (e.g., because of poor transmission quality from the media content system 112, because of a lag in processing capability at the client device 102), because of background sound distorting the output audio content, etc.), or if the speaker(s) 109 are otherwise not outputting audio content (e.g., speaker(s) 109 are powered off or broken).

In some implementations, the client device 140 includes one or more applications 127. As discussed in greater detail herein, the one or more applications 127 receive and present information received from the server 106, including, for example, entities in media content, information about entities in media content, guides to moments or otherwise notable portions in media content, and polls related to moments in media content. In some implementations, the one or more applications 127 receive and present information related to the audible verbal information or subtitles data within the media content from the server 106. In some implementations, the applications 127 include an assistant application. An assistant application obtains and presents information (e.g., reminders) relevant to the user based on a variety of signals, including, but not limited to, the user's demographic information, the current location of the device and/or the user, the user's calendar, the user's contact list, the user's social network(s), the user's search history, the user's web browsing history, the device's and/or the user's location history, the user's stated preferences, the user's content viewing history, and the content being currently presented to the user. In some implementations, the client device 102 also includes one or more of the applications 127.

In some implementations, an application 127 (e.g., an assistant application) at the client device 140 or 102 displays a guide to or listing of "moments" in media content. In some implementations, moments in a respective media content item are particular events or scenes or points in time or portions in a media content item that have attracted interest and/or popularity (e.g., a controversial moment, etc.). In some implementations, the interest and/or popularity is determined by analyzing a search history and identifying search volume related to the media content item that indicates interest and/or popularity (e.g., spikes in the volume of search queries with particular keywords). The moments guide in media content may include moments from a particular media content item 126 or from multiple media content items (e.g., media content during the past week, media content of a particular category, etc.). In some implementations, the guide is generated by the server 106 and received by the client device 140 or 102 from the server 106. The client device may receive and display a guide periodically, on a schedule, or in response to respective triggers (e.g., the user launches the application 127, the use requests a guide, etc.), where the schedule, periodicity, and/or triggers are configurable by the user.

In some implementations, an application 127 (e.g., an assistant application) at the client device 140 or 102 receives a user command or request for a poll to be generated for the playing media content item 126. The application processes the command, generates content information from the playing media content item in accordance with the command, and sends the content information to the server 106 for identification of the playing media content item and the playback position, identification of moments in the media content item, and optionally identification of entities associated with the playing media content item. The application 127 displays one or more polls, generated by the server 106, associated with moments in the playing media content item. The user may then share one or more of these polls (e.g., on the user's social network).

In some implementations, a respective moment in the moments guide and/or a respective poll includes one or more affordances. These affordances, when activated by a user, activate presentation of the corresponding media content item or a portion of the media content item that constitutes the associated moment. In other words, the moment or poll links users to the corresponding media content item and/or deeplinks users to the associated moment in the corresponding media content item.

In some implementations, the server system 106 includes a front end server 114 that facilitates communication between the server system 106 and client devices 102 and 140, media content system 112, search engine 172, and video content hosts 176 via the network(s) 104. In some implementations, the front end server 114 receives content information from the client device 102 and/or the client device 140. In some implementations, the content information is a video or audio stream or a portion thereof. In some implementations, the content information is derived or extracted from a media content item 126 being played, displayed, or presented on the client device 102 (e.g., a portion of a video stream playing on the client device 102 and one or more fingerprints of that portion). In some implementations, the content information includes capture of audio from the media content item. In some implementations, the front end server 114 is configured to send content or content links to a client device 102 or 140. In some implementations, the front end server 114 is configured to send or receive one or more videos or audio pieces, or video or audio streams.

According to some implementations, a video or video stream is a sequence of images or frames representing scenes in motion. A video should be distinguished from a still image. A video displays a number of images or frames per second. For example, a video displays 24 or 30 consecutive frames per second. In contrast, an image is not necessarily associated with any other image.

In some implementations, the front end server 114 receives search data 174 from the search engine 172. The search data 174 includes data on searches submitted by users to, and performed by, the search engine 172. The search data 174 includes, for example, search queries and times the queries were submitted. In some implementations, the search data also includes user information, such the identity of the user who submitted the search (if the user consents to the search engine 172 logging the user's search history and associating that search history to the user) and/or demographic information associated with the user. The search data 174 may be analyzed to determine statistics regarding search queries including, for example, volumes of search queries overall and over time (e.g., how many times a query was submitted by users within the past week or the past hour). In some implementations, the search engine 172 is a part of the server system 106, and search data 174 may be provided to modules or components within the server system 106 without going through the front end server 114.

In some implementations, the server system 106 includes a user database 130 that stores user data. In some implementations, the user database 130 is a distributed database. The user data stored in the user database 130 includes, for example, log-in information, user profiles, user settings, and watch lists of media content.

In some implementations, the server system 106 includes a content identification module 118 configured to receive content information from the client device 102 and/or the client device 140, match the content information to a content fingerprint in a content/fingerprint database 120, and identify the media content item 126 (e.g., a "video content item," such as a movie, television series episode, video clip, or any other distinct piece of video content consumed as a distinct file or as a stream; an "audio content item," such as a song, audio clip, or any other distinct piece of audio content consumed as a distinct file or as a stream) being presented at the client device 102 based on the matching of the content information and the content fingerprint. In some implementations, the content identification module 118 also identifies the current position in the media content item 126 (e.g., the position or how far in the video content is being presented on the client device 102). The identity of the media content item 126 and the current position in the media content item 126 is passed onto an entities module 144, which identifies one or more entities related to the identified media content item 126 and optionally the current position in the identified media content in an entities database 122. In some implementations, entities include media content (e.g., movies, television programs, songs, albums, radio shows, podcasts, episodes of any of the above, etc.), artists and artist groups (e.g., individual singers, bands, orchestras, performance troupes, etc.), sports teams, and other individuals and organizations.

The server 106 includes an entities database or repository 122. The entities database 122 is a database of entities associated with media content. As used herein, an entity is any distinct or otherwise objectively identifiable existence, being, or item that is associated with media content. In some implementations, entities include, without limitation, titles, people, places, music, things, products, quotations, events, and awards. For example, titles include movie titles, series titles (e.g., television series titles), and episode titles (e.g., television episodes titles). People include cast members (e.g., actors), crew members (e.g., director, producer, music composer, etc.), in-story characters, competition contestants, competition judges, hosts, guests, and people mentioned. Places include in-story locations, filming locations, and locations mentioned. Music includes songs and compositions used in the video content. Things include in-story objects (e.g., lightsabers in "Star Wars"). Products include any good, service, or item mentioned or shown in video content (e.g., mentioned book, products included in video content due to product placement). Quotations include pieces of spoken dialogue from video content, such as lines and catchphrases spoken by characters or non-fictional people in video content (e.g., "May the Force be with you."). Awards include any awards associated with a piece of video content and its entities (e.g., best actor, best director, best song, etc.). It should be appreciated that the entity types or categories and corresponding descriptions or definitions described above are examples and are non-exhaustive. Other types or categories of entities are possible, and the types or categories of entities described above may have broader or narrower definitions than as described above.

In some implementations, the entities database 122 also includes a graph network that indicates associations between entities. For example, a movie entity (e.g., the movie title entity as the entity representing to the movie) is linked to its cast member entities, crew member entities, in-story location entities, quotation entities, and so on. The graph network is implemented using any suitable data structure.

In some implementations, the entities database 122 also includes information regarding when an entity appears, is mentioned, or is said (e.g., in the case of a quotation) in media content. For example, the entities database 122 stores information on, for example, when a particular movie title is mentioned in a media content item (as identified by a title (e.g., movie title, television show title) of the media content item). Such information may be stored as times and/or time ranges within a media content item corresponding to the entity corresponding to the media content item. Similarly, the entities database 122 stores information on when within a media content item an event is mentioned, when a thing appears or is mentioned, when a product appears or is mentioned, and so forth. In some implementations, the entities database 122 also includes temporal information associated with entities. For example, for an entity that is a TV program, the entities database 122 can store known current and future air dates and times, and optionally past air dates (e.g., date and time of debut airing), for the program. As another example, for a performer entity (e.g., a singer, an orchestra, a dance troupe, etc.), the entities database 122 can store known current and future performance dates, and optionally past performance dates, for the performer. In some other implementations, temporal information associated with entities is stored in another database.

In some implementations, entities in the entities database 122 are also associated with non-entities outside of the entities database. For example, a person entity in the entities database 122 may include links to web pages of news stories associated with the person.

In some implementations, the entities database 122 also stores records or data corresponding to moments (e.g., identified by moments module 148) associated with media content and polls (e.g., generated by polling module 150) associated with the moments. In some other implementations, the records or data corresponding to moments and/or polls are stored separately from the entities database 122 within the server system 106, and the entities database 122 includes references to the moments and/or polls.

In some implementations, the server 106 also includes textual information corresponding to audible verbal information in media content. The textual information is displayable information, in written textual form, corresponding to audible verbal information in media content. Textual information includes, for example, transcription of spoken speech (e.g., dialogue, monologue, etc.) in a video, song lyrics, and translations and/or romanizations of spoken speech or lyrics. Sources of textual information include, for example, subtitles data, online documents (e.g., transcripts posted online), and speech-to-text conversions of audible verbal information from the media content.

In some implementations, the server 106 stores textual information, and links to sources of textual information (e.g., link to a document hosted at a content host 170), in the entities database 122. Within the entities database 122, respective textual information and the corresponding sources may be associated with respective entities (e.g., the person who sung the lyrics, the person who spoke the speech, the movie or television series in which the song or speech was sung or spoken, etc.). In some other implementations, the textual information and the links to the sources thereof are stored in a separate database or repository (not shown) in the server 106. Respective textual information and corresponding sources in the separate database/repository may be associated with respective entities in the entities database 122. For sake of convenience, the description below assumes that the textual information and the links to the sources thereof are stored in the entities database 122.

In some implementations, the server system 106 includes a content/fingerprint database 120 that stores content fingerprints and other content identifying information (e.g., content metadata, subtitles data, electronic program guide data). As used herein, a content fingerprint is any type of condensed or compact representation, or signature, of the content of a media content item (e.g., video stream and/or audio stream and/or subtitles data corresponding to the video stream and/or audio stream). In some implementations, a fingerprint may represent a clip (such as several seconds, minutes, or hours) or a portion of a video stream or audio stream or the corresponding subtitles data. Or, a fingerprint may represent a single instant of a video stream or audio stream or subtitles data (e.g., a fingerprint of single frame of a video or of the audio associated with that frame of video or the subtitles corresponding to that frame of video). Furthermore, since media content may change over time, corresponding fingerprints of that media content may also change over time. In some implementations, the content/fingerprint database 120 is a distributed database.

In some implementations, the server 106 includes an entities module 144. The entities module 144 identifies and extracts entities related to media content and stores the extracted entities in the entities database 122. The entities module 144 extracts entities related to media content from media content (e.g., from content information) and from other sources (e.g., web pages hosted by third party hosts, media content hosted at video content hosts 176). In some implementations, the entities module 144 also identifies one or more entities in media content 126, retrieves information on the identified entities from the entities database 122, and provides the information to the front end server 114, for sending to a client device (e.g., client device 140) for presentation and/or to another module for further processing or operation.

In some implementations, the server system 106 includes a search analysis module 146. The search analysis module 146 analyzes search data 174 to identify search queries and determine corresponding levels of interest. In some implementations, the levels of interest are determined based on search volume, and the search analysis module 146 looks for queries with spikes in search volume.

In some implementations, the server system 106 includes a moments module 148. The moments module 148 compares the search queries identified by the search analysis module 146 to information associated with media content (e.g., subtitles data and media content metadata from the content identification database 120) to identify search queries that are associated with media content and particular portions of media content. The moments module 146 identifies at least some of these particular portions of media content as moments in media content with which respective search queries are associated. In some implementations, this identification is based on matching the keywords in the search queries to words and phrases in information associated with media content (e.g., subtitles data and media content metadata). The moments module 148 also generates listings or guides of moments in media content for presentation to users.

In some implementations, the server system 106 includes a polling module 150. The polling module 150 generates polls associated with moments in media content. The polling module 150 also collects and tabulates the polling results.

In some implementations, the front end server 114 sends guides or listings of moments to client devices (e.g., client device 140 and/or 102) periodically, on a schedule, or in response to a triggering event. For example, a moments guide may be sent to a client device 140 weekly or monthly, in response to a user request for a moments guide, or whenever a particular application on the client device 140 is launched.

In some implementations, the front end server 114 receives a user request, from the client device 140, the request including content information (e.g., portion/snippet of audio content, etc.) corresponding to a media content item 126 being played on the client device 102. The user request is a request for a poll associated with a moment in the media content item 126. The content identification module 118 identifies the media content item 126 and a playback position in the media content item 126 based on the content information. The moments module 148 identifies a moment that is associated with the identified media content item 126 and playback position. The polling module 150 identifies a poll in the entities database 122 that is associated with the identified moment, or generates the poll if an already-generated poll associated with the identified moment is not available. The poll associated with the identified moment, and optionally additional polls associated with other moments in the media content item 126, are sent by the front end server 114 to the client 140 for display. At the client device 140, one or more of the polls may be shared to other client devices (e.g., through a social network).

In some implementations, the client-server environment 100 also includes one or more video content hosts 176. The video content hosts 176 hosts media content (e.g., video content). The server system 106 may obtain subtitles data, content fingerprints, and other media content identifying information (e.g., video metadata) from the video content hosts 176 to populate the content database 120. In some implementations, the media content system 122 is also a video content host 176.

Figure 1B:
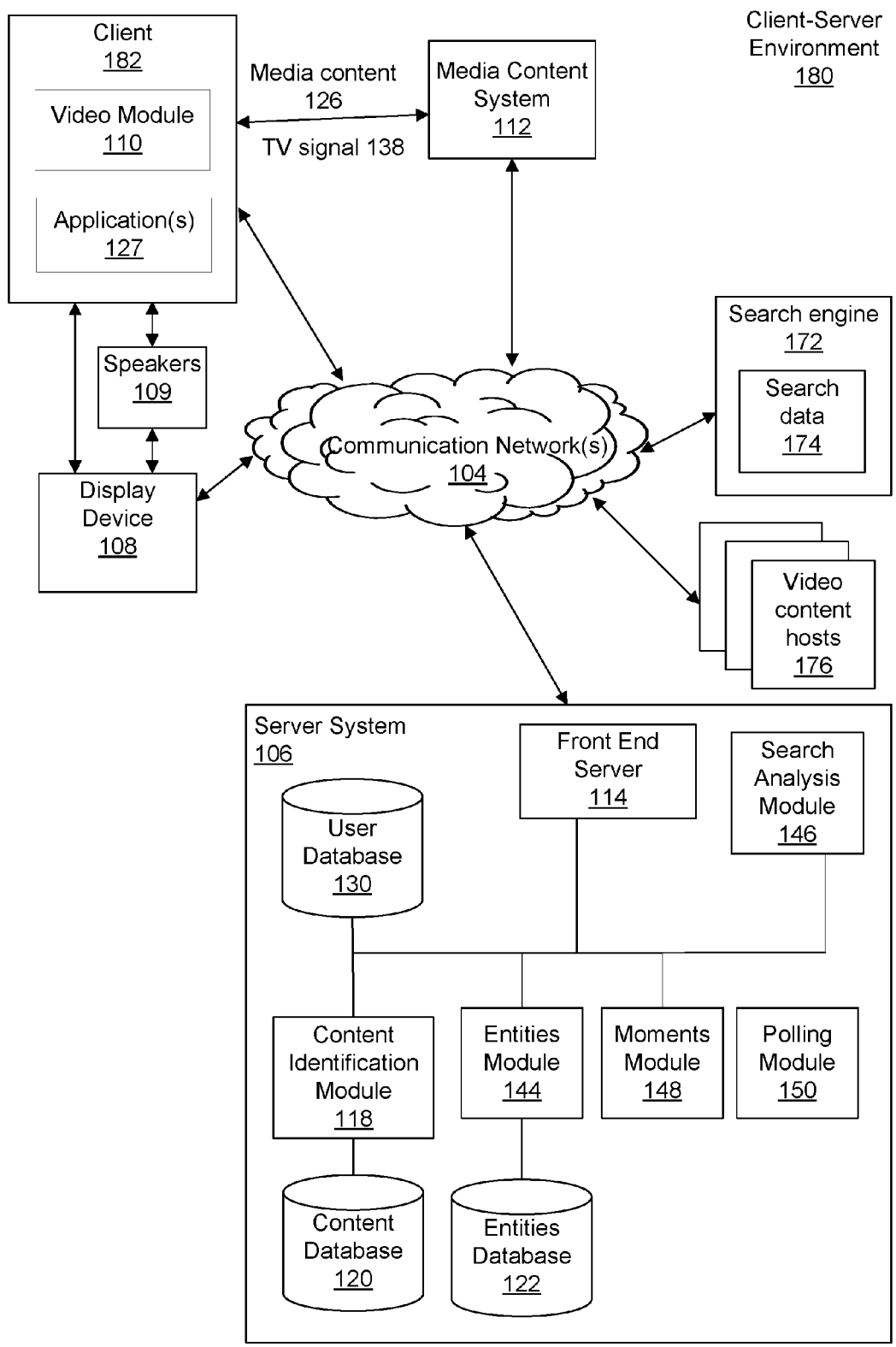

FIG. 1B depicts a client-server environment 180 that is similar to the client-server environment 100 depicted in FIG. 1A. In FIG. 1B, the features and components of client devices 102 and 140 (FIG. 1A) are combined, unified, or subsumed under a client device 182. In the client-server environment 180, the client device 182 device receives and presents the media content 126. The client device 182 sends the content information 142 to the server 106. The server 106 identifies the media content and sends polls to the client device 182 for presentation. The server 106 also sends moments guides to the client device 182 for presentation. In other aspects, the client-server environment 180 is same as or similar to the client-server environment 100. Thus, the details are not repeated here.

In some other embodiments, the features and components of client devices 102 and 140 (FIG. 1A) are included in a client device and a display-less secondary device. For example, continuing with the example illustrated in FIG. 1B, the client device 182 may be associated with a display-less secondary device (e.g., a remote control). The secondary device includes a microphone that performs capture of audio of media content playing at the client device 182 and capture of voice input commands from users. The secondary device performs the capture of media content audio and/or voice inputs from users, and sends the captured audio and/or voice inputs to the client device 182 for further processing (e.g., by an application 127). Thus, for example, a user may be streaming media content from the media content system 112 on the client device 182 and the media content is displayed on a display 108 coupled to the client device 182. The user issues a request, which is captured by the secondary device. The secondary device sends the captured request to the client device 182 for processing. The client device 182 displays the response to the request (e.g., polls associated with moments) on the display 108.

Figure 2:
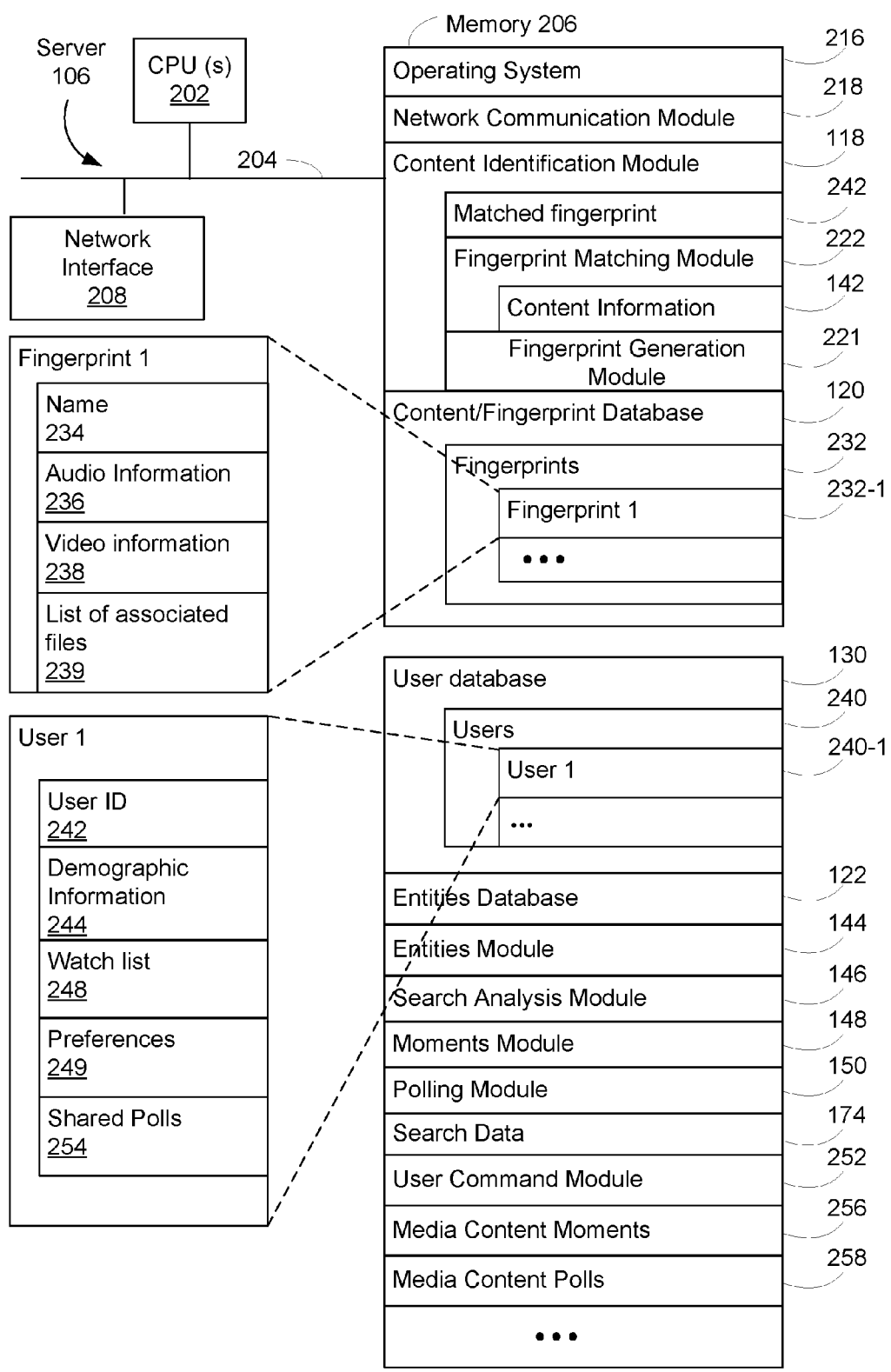
FIG. 2 is a block diagram illustrating the structure of an example server system according to some implementations.

FIG. 2 is a block diagram illustrating a server system 106, in accordance with some implementations. The server system 106 typically includes one or more processing units (CPU's) 202, one or more network or other communications interfaces 208, memory 206, and one or more communication buses 204 for interconnecting these components. The communication buses 204 optionally include circuitry (sometimes called a chipset) that interconnects and controls communications between system components. Memory 206 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 206 may optionally include one or more storage devices remotely located from the CPU(s) 202. Memory 206, including the non-volatile and volatile memory device(s) within memory 206, comprises a non-transitory computer readable storage medium. In some implementations, memory 206 or the non-transitory computer readable storage medium of memory 206 stores the following programs, modules and data structures, or a subset thereof including an operation system 216, a network communication module 218, a content identification module 118, a content/fingerprint database 120, an entities database 122, a user database 130, an entities module 144, a search analysis module 146, a moments module 148, a polling module 150, search data 174, user command module 252, media content moments 256, and media content polls 258.

The operating system 216 includes procedures for handling various basic system services and for performing hardware dependent tasks.

The network communication module 218 facilitates communication with other devices via the one or more communication network interfaces 208 (wired or wireless) and one or more communication networks, such as the Internet, other wide area networks, local area networks, metropolitan area networks, and so on.

The content/fingerprint database 120 stores one or more content fingerprints 232. In some implementations, a fingerprint 232 (e.g., fingerprint 232-1) includes a name 234, fingerprint audio information 236 and/or fingerprint video information 238, and a list of associated files 239. The name 234 identifies the respective content fingerprint 232. For example, the name 234 can include the name of an associated television program, movie, or advertisement. In some implementations, the fingerprint audio information 236 includes a fingerprint or other compressed representation of a portion (such as several seconds, minutes, or hours) of the audio content of a video stream or an audio stream. In some implementations, the fingerprint video information 238 includes a fingerprint of a portion (such as several seconds, minutes, or hours) of a video stream. In some implementations, the fingerprint 232 includes a fingerprint or other representation of a portion of the subtitles data of a video stream. In some implementations, the content/fingerprint database 120 stores other information that can be used to identify media content items (e.g., content metadata, subtitles data, etc.) (not shown). Fingerprints 232 and other content identifying information in the content/fingerprint database 120 are periodically updated.

The user database 130 includes user data 240 for one or more users. In some implementations, user data 240 (e.g., user data 240-1) for a respective user includes a user identifier 242, demographic information 244, preferences 249, and shared polls 254. The user identifier 242 identifies a user. For example, the user identifier 242 can be an IP address associated with a client device 102 or an alphanumeric value chosen by the user or assigned by the server that uniquely identifies the user (e.g., a user account name, a user ID number). The demographic information 244 includes one or more characteristics of the respective user. The demographic information may include one or more of, without limitation: age, gender, income, geographic location, education, wealth, religion, race, ethic group, marital status, household size, employment status, and political party affiliation. Watch list 248 is a list of media content (e.g., movies, television shows, etc.) the user wishes to watch in the future. Preferences (or user settings) 249 are set or specified by the user, and indicate preferences regarding geographic location, genres, categories, and so on. For example, the preferences 249 may specify the user's preferences regarding genres or categories of media content (e.g., comedy, documentary, drama, sci-fi, romance, action, etc.). Shared polls 254 include data regarding which polls generated by the polling module 150 have been shared by the user. Polls generated by the polling module 150 are further described below.

In some implementations, the user data 240 for a respective user also includes one or more of: a search history (e.g., search queries the user has submitted to search engines), a content browsing history (e.g., web pages viewed by the user), a content consumption history (e.g., videos the user has viewed), and user account information (e.g., services with which the user's account is associated, login information for other accounts to which the user has given authorization to access).

The content identification module 118 receives content information from the client device 102 or 140, and identifies the media content being presented at the client device 102 or 140. The content identification module 118 includes a fingerprint matching module 222. In some implementations, the content identification module 118 also includes a fingerprint generation module 221, which generates fingerprints from the content information or other media content saved by the server. In some implementations, the content identification module 118 identifies the media content based on information other than, or in addition to, the fingerprint. For example, the content identification module 118 may use information obtained from inaudible tones, optical character recognition (OCR) of on-screen text, subtitles data, transmissions of information from the client device 102 by Bluetooth, etc. to identify the media content. In some implementations, the client device 102/140 includes information obtained from obtained from inaudible tones, optical scan recognition of on-screen text, subtitles data, transmissions of information from the client device 102 by Bluetooth, etc. in the content information sent to the server 106.

The fingerprint matching module 222 matches at least a portion of the content information (or a fingerprint of the content information generated by the fingerprint generation module) to a fingerprint 232 in the fingerprint database 120. The matched fingerprint 242 is sent to the entities module 144, which retrieves entities associated with the matched fingerprint 242 from the entities database 122. The matched fingerprint 242 includes content information received from the client device 102. In some implementations, the content information includes audio information, video information, a user identifier, and optionally subtitles data. The user identifier in the content information identifies a user associated with the client device 102 or 140 from which the content information is sent. For example, the user identifier can be an IP address associated with a client device 102, or an alphanumeric value chosen by the user or assigned by the server that uniquely identifies the user. In some implementations, the audio information includes a clip (such as several seconds, minutes, or hours) of a video stream or audio stream that was played on the client device 102. In some implementations, the video information includes a clip (such as several seconds, minutes, or hours) of a video stream that was played on the client device 102.

The entities database 122 includes entities associated with media content. The entities database 122 is further described below, with reference to FIG. 4.

The entities module 144 identifies, and selects or retrieves, entities from the entities database 122 that are associated with a media content item and optionally a position within the media content item, based on the matched fingerprint 242 or other criteria. The selected/retrieved entities may be a subset of the entities referenced in the matched fingerprint 242 (e.g., the entities module 144 selects an entity that is referenced in the matched fingerprint 242).

The search analysis module 146 analyzes search data 174 to identify search queries and corresponding times, determine which search queries are related and thus may be clustered together, and determine levels of interest corresponding to search queries and/or clusters of related queries (e.g., by identifying search queries with search volume spikes).

The moments module 148 identifies or determines moments of interest in media content by comparing (e.g., matching) the search queries to information that can be used to identify media content and positions within media content (e.g., subtitles data). The moments module 148, based on these comparisons, determines moments 256 in media content; portions of or positions in media content are matched to search queries with high levels of interest to determine which portions or positions are moments of interest. The moments module 148 also generates guides or listings of moments for transmission to client devices. The guides or listings may be personalized to the user (e.g., based on the user's preferences 249 and/or the user's interests and preferences as indicated by the user's search history and/or media consumption history).

The polling module 150 generates polls 258 associated with moments (as identified or determined by the moments module 148) in media content.

Search data 174, received from one or more search engines (e.g., search engine 172), includes a history of search queries (e.g., keywords and parameters in the queries) and corresponding dates and times.

The user command module 252 processes user commands or requests (e.g., verbal commands/requests) received from client devices 140/102 to determine what the requests are and parameters, if any, included in the respective commands/requests. In some implementations, the user command module 252 includes a voice processing module for processing verbal commands and requests (e.g., transcription, speech-to-text conversion, natural language processing, keyword identification, text parsing, etc.).

Media content moments 256 includes records or data corresponding to moments determined by the moments module 148.

Media content polls 258 include records or data corresponding to polls generated by the polling module 150.

Each of the above identified elements may be stored in one or more of the previously mentioned memory devices, and each of the modules or programs corresponds to a set of instructions for performing a function described above. The set of instructions can be executed by one or more processors (e.g., the CPUs 202). The above identified modules or programs (i.e., content identification module 118) need not be implemented as separate software programs, procedures or modules, and thus various subsets of these modules may be combined or otherwise re-arranged in various implementations. In some implementations, memory 206 may store a subset of the modules and data structures identified above.

Furthermore, memory 206 may store additional modules and data structures not described above.

Although FIG. 2 shows a server system, FIG. 2 is intended more as functional description of the various features which may be present in a set of servers than as a structural schematic of the implementations described herein. In practice, and as recognized by those of ordinary skill in the art, items shown separately could be combined and some items could be separated. For example, some items (e.g., operating system 216 and network communication module 218) shown separately in FIG. 2 could be implemented on single servers and single items could be implemented by one or more servers. The actual number of servers used to implement the server system 106 and how features are allocated among them will vary from one implementation to another, and may depend in part on the amount of data traffic that the system must handle during peak usage periods as well as during average usage periods.

Figure 3A:
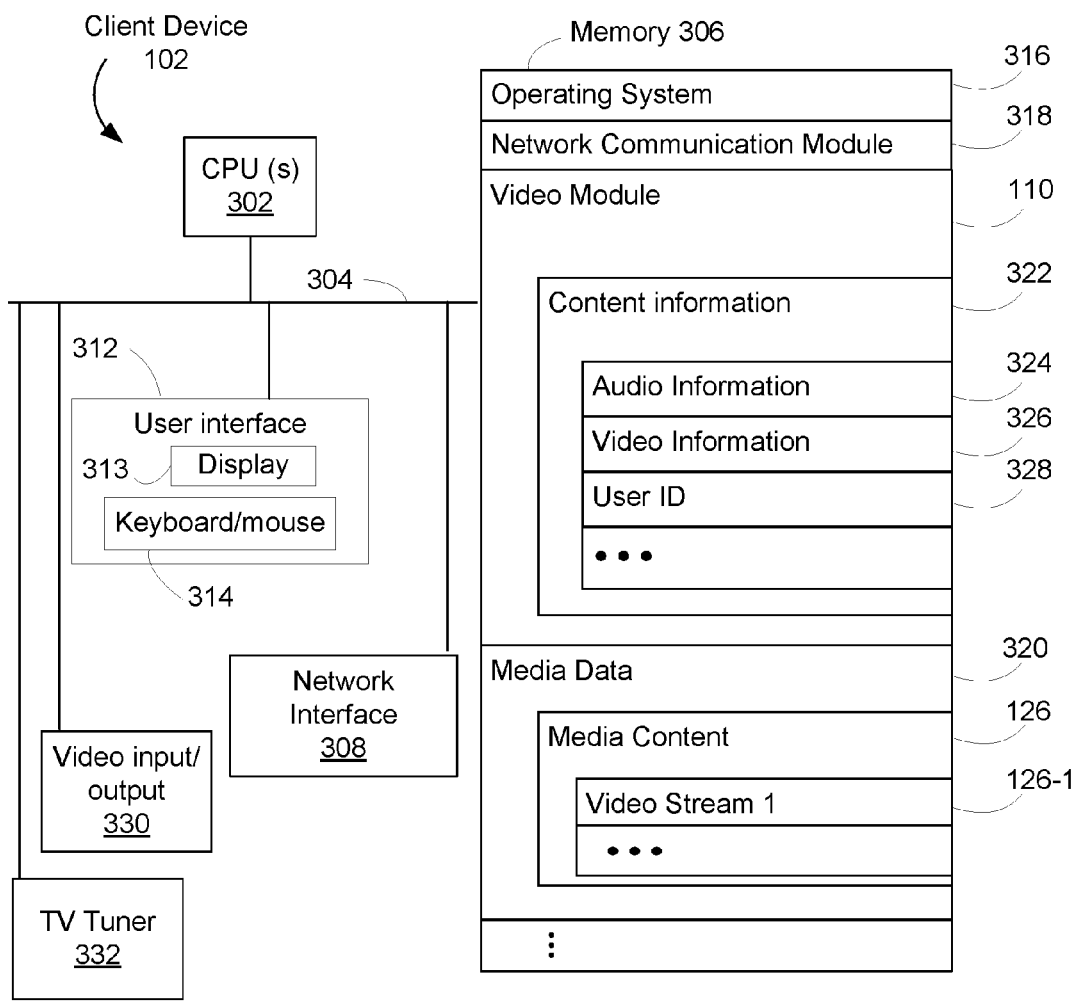
FIG. 3A is a block diagram illustrating the structure of an example client device according to some implementations.
Figure 3B:
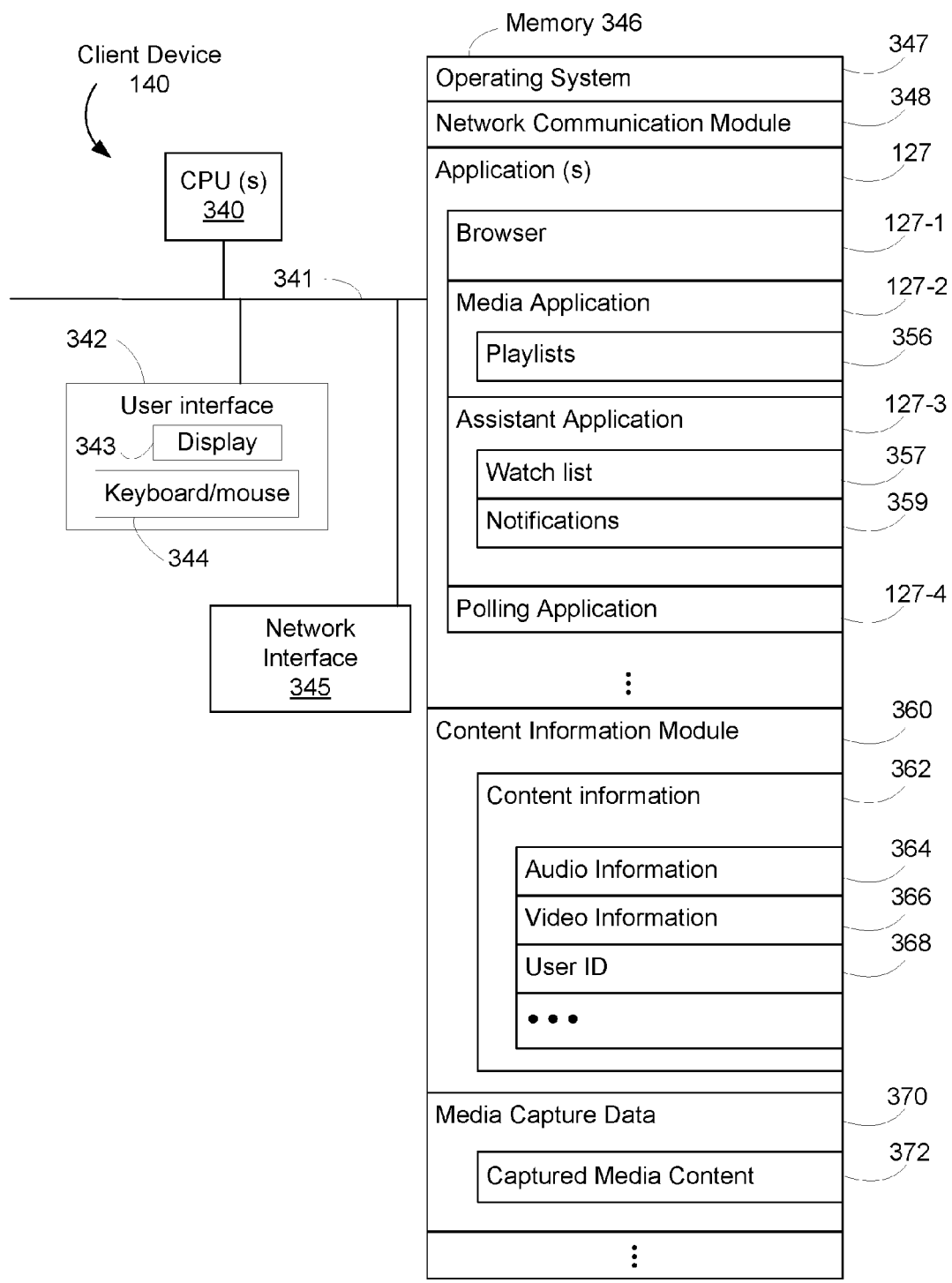
FIG. 3B is a block diagram illustrating the structure of an example client device according to some implementations.

FIG. 3A is a block diagram illustrating a client device 102, in accordance with some implementations. The client device 102 typically includes one or more processing units (CPU's) 302, one or more network or other communications interfaces 308, memory 306, and one or more communication buses 304, for interconnecting these components. The communication buses 304 optionally include circuitry (sometimes called a chipset) that interconnects and controls communications between system components. The client device 102 may also include a user interface comprising a display device 313 (e.g., display 108) and a keyboard and/or mouse (or other pointing device) 314. In some implementations, the client device 140 includes an audio output device (e.g., speaker(s) 109). Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternatively the non-volatile memory device(s) within memory 306, comprises a non-transitory computer readable storage medium. In some implementations, memory 306 or the computer readable storage medium of memory 306 store the following programs, modules and data structures, or a subset thereof including operation system 316, network communication module 318, a media module 110 and media data 320.

In some implementations, the client device 102 includes an input/output 330 for receiving and outputting media content streams or data. In some implementations, the input/output 330 is configured to receive media content streams from radio transmissions, satellite transmissions, and cable lines. In some implementations the input/output 330 is connected to a set top box. In some implementations, the input/output 330 is connected to a satellite dish. In some implementations, the input/output 330 is connected to an antenna. In some implementations, the client device 102 receives the media content stream through the network interface 308 (e.g., receiving a video stream through the Internet), as opposed to through the input/output 330.

In some implementations, the client device 102 includes a television tuner 332 for receiving and processing video streams or TV signals.

The operating system 316 includes procedures for handling various basic system services and for performing hardware dependent tasks.

The network communication module 318 facilitates communication with other devices via the one or more communication network interfaces 308 (wired or wireless) and one or more communication networks, such as the Internet, other wide area networks, local area networks, metropolitan area networks, and so on.

The data 320 includes media content 126. The media content 126 may include, for example, a video stream 126-1, an audio stream, a video file, and/or an audio file. In some implementations, the media content 126 is received from a media content system 112.

The media module 110 derives content information 322 from media content 126. In some implementations, the content information 322 includes audio information 324, video information 326, a user identifier 328, information from inaudible tones, information from OCR of on-screen text, etc. or any combination thereof. The user identifier 328 identifies a user of the client device 102. For example, the user identifier 328 can be an IP address associated with a client device 102 or an alphanumeric value chosen by the user or assigned by the server that uniquely identifies the user. In some implementations, the audio information 324 includes a portion (such as several seconds, minutes, or hours) of media content 126 (e.g., a video stream, an audio stream). In some implementations, the video information 326 includes a portion (such as several seconds, minutes, or hours) of media content 126. In some implementations, the content information 322 includes subtitles data corresponding to the media content 126. In some implementations, the video information 326 and audio information 324 are derived from media content 126 that is playing or was played on the client device 102. The media module 110 may generate several sets of content information for respective media content 126.

Each of the above identified elements may be stored in one or more of the previously mentioned memory devices, and each of the modules or programs corresponds to a set of instructions for performing a function described above. The set of instructions can be executed by one or more processors (e.g., the CPUs 302). The above identified modules or programs (i.e., sets of instructions) need not be implemented as separate software programs, procedures or modules, and thus various subsets of these modules may be combined or otherwise re-arranged in various implementations. In some implementations, memory 306 may store a subset of the modules and data structures identified above. Furthermore, memory 306 may store additional modules and data structures not described above.

Although FIG. 3A shows a client device, FIG. 3A is intended more as functional description of the various features which may be present in a client device than as a structural schematic of the implementations described herein. In practice, and as recognized by those of ordinary skill in the art, items shown separately could be combined and some items could be separated.

FIG. 3B is a block diagram illustrating a client device 140, in accordance with some implementations. The client device 140 typically includes one or more processing units (CPU's) 340, one or more network or other communications interfaces 345, memory 346, and one or more communication buses 341, for interconnecting these components. The communication buses 341 optionally include circuitry (sometimes called a chipset) that interconnects and controls communications between system components. The client device 140 may also include a user interface comprising a display device 343 (e.g., display 128) and a keyboard and/or mouse (or other pointing device) 344. In some implementations, the client device 140 includes an audio output device (e.g., speaker(s) 129) and/or an audio capture/input device (e.g., microphone 141). Memory 346 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 346 may optionally include one or more storage devices remotely located from the CPU(s) 340. Memory 346, or alternatively the non-volatile memory device(s) within memory 346, comprises a non-transitory computer readable storage medium. In some implementations, memory 346 or the computer readable storage medium of memory 346 store the following programs, modules and data structures, or a subset thereof including operation system 347, network communication module 348, applications 127, content information module 360, and media capture data 370.

The operating system 347 includes procedures for handling various basic system services and for performing hardware dependent tasks.

The network communication module 348 facilitates communication with other devices via the one or more communication network interfaces 345 (wired or wireless) and one or more communication networks, such as the Internet, other wide area networks, local area networks, metropolitan area networks, and so on.

The client device 140 includes one or more applications 127. In some implementations, the applications 127 include a browser application 127-1 (e.g., a web browser application), a media application 127-2, an assistant application 127-3, and a polling application 127-4. The browser application 127-1 renders and displays, for example, web pages. The media application 127-2 performs one or more of the following operations: plays media content (e.g., video, audio), displays images, and manages playlists 356. The assistant application 127-3 (which may also be referred to as an "intelligent personal assistant" application) displays information that is relevant to the user (e.g., entries in the watch list 357; notifications 359 (e.g., news, sports scores); upcoming appointments; traffic on a route; etc.) and perform tasks or services relevant to the user or requested by the user (e.g., sending alerts to notify friends of tardiness to an appointment, schedule updating, calling a phone number). Polling application 127-4 performs operations associated with polls generated by polling module 150, including for example, displaying one or more polls associated with moments in media content item 126, sharing polls in accordance with user request, and receiving and processing user responses to the polls. In some implementations, one or more of the applications 127 can access, with the user's authorization, one or more services where the user has an account. It should be appreciated that applications 127 are not limited to the applications discussed above.

The content information module 360 generates content information 362 for a media content item 126 playing or played at the client device 102. The content information module 360 generates content information 362 from data corresponding to the media content item 126 (e.g., captured media content 372, metadata corresponding to the media content item 126). In some implementations, the content information 362 includes audio information 364, video information 366, a user identifier 368, information from inaudible tones, information from OCR of on-screen text, etc. or any combination thereof. The user identifier 368 identifies a user of the client device 102. For example, the user identifier 368 can be an IP address associated with a client device 102 or an alphanumeric value chosen by the user or assigned by the server that uniquely identifies the user. In some implementations, the audio information 364 includes a portion (such as several seconds, minutes, or hours) of media content 126 (e.g., a video stream, an audio stream). In some implementations, the video information 366 includes a portion (such as several seconds, minutes, or hours) of media content 126. In some implementations, the content information 362 includes subtitles data corresponding to the media content 126. In some implementations, the video information 366 and audio information 364 are derived from media content 126 that is playing or was played on the client device 102. The content information module 360 may generate several sets of content information for respective media content 126.

Media capture data 370 stores captured data associated with media content. The data 370 includes, for example, captured media content 372 (e.g., audio) corresponding to a media content item 126.

Each of the above identified elements may be stored in one or more of the previously mentioned memory devices, and each of the modules or programs corresponds to a set of instructions for performing a function described above. The set of instructions can be executed by one or more processors (e.g., the CPUs 340). The above identified modules or programs (i.e., sets of instructions) need not be implemented as separate software programs, procedures or modules, and thus various subsets of these modules may be combined or otherwise re-arranged in various implementations. In some implementations, memory 306 may store a subset of the modules and data structures identified above. Furthermore, memory 306 may store additional modules and data structures not described above.

Although FIG. 3B shows a client device, FIG. 3B is intended more as functional description of the various features which may be present in a client device than as a structural schematic of the implementations described herein. In practice, and as recognized by those of ordinary skill in the art, items shown separately could be combined and some items could be separated.

Figure 4:
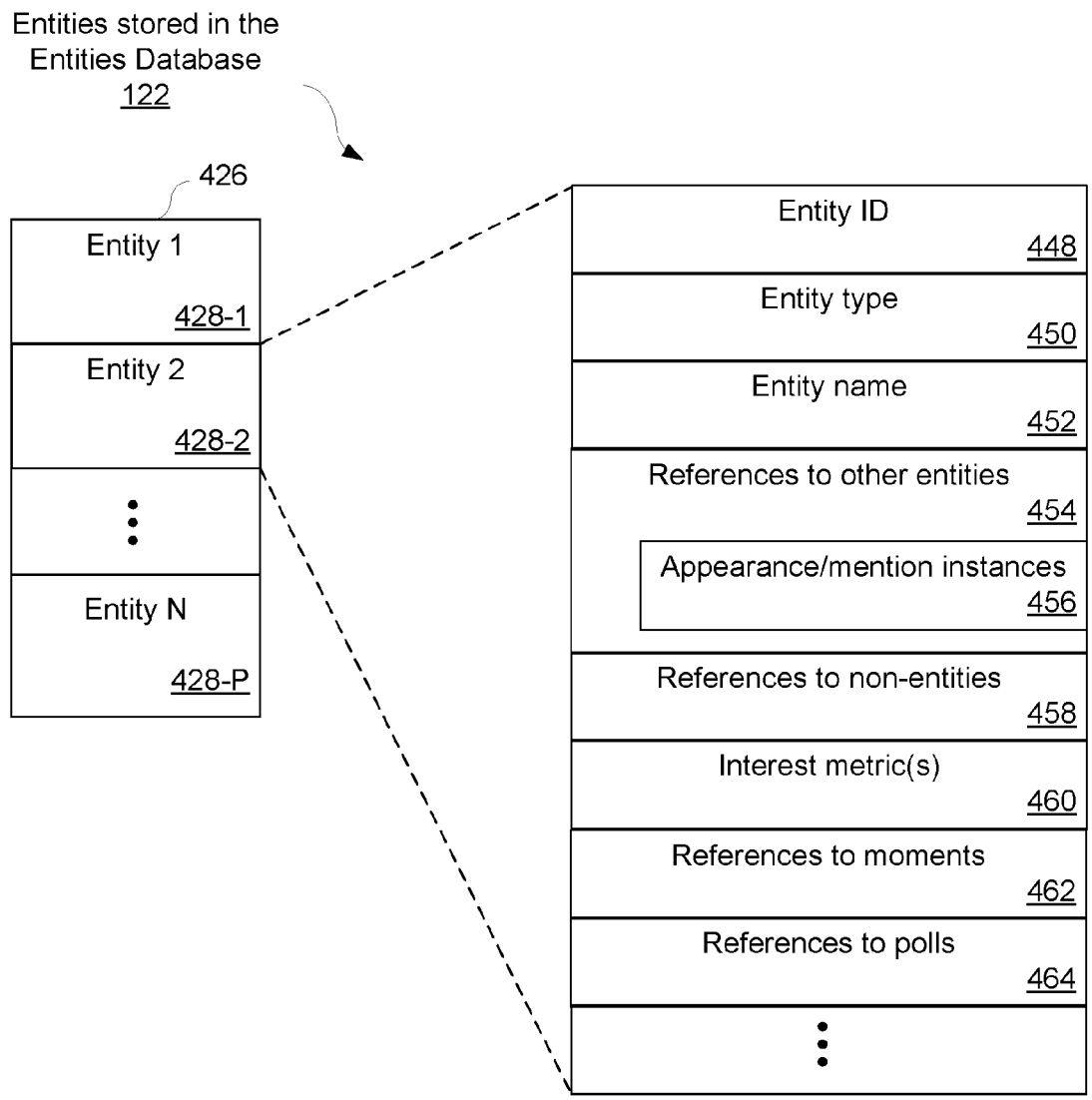
FIG. 4 illustrates an example data structure according to some implementations.

FIG. 4 illustrates entities data structures 426 stored in the entities database 122, according to some implementations. A respective entity 428 includes an entity identifier ("entity ID") 448, entity type 450, entity name 452, references to other entities 454, references to non-entities 458, interest metrics 460, references to moments 462, references to polls 464, and optionally, additional information. In some implementations, the entity ID 448 uniquely identifies a respective entity 428. The entity type 450 identifies the type of the entity 428. For example, the entity type 450 for a respective entity 428 in the entities database 122 indicates that the respective entity 428 is a title, person, place, music, thing, product, quotation, and award. In some implementation, the entity type 450 also indicates sub-types (e.g., for people, cast or crew or character or contestant or judge or host or guest or mentioned person). The entity name 452 names the entity. For example, the entity name, depending on the entity, is the title of the movie or television show, person name, place name, song or composition name, name of a thing, a product name, the actual words of a quotation, or the award name. References to other entities 454 indicate references to other entities 428 (e.g., by their entity IDs 448). For example, an entity 428 corresponding to a movie title includes references 454 to the movie's cast members, crew members, characters, places, and so on. A quotation entity includes references to the video content (movie, televisions show, etc.) in which the quotation is spoken, and the person (actor, character, etc.) who spoke the quotation in the video content. When appropriate, the references to other entities include data on instances 456 when the other entities appear or are mentioned. For example, the instances 456 data for a movie title entity include time ranges for when a cast member or a character appears, or when a product is mentioned, and so on. References to non-entities 458 include references to content not stored as entities in the entities database 122 that are nevertheless related to the entity 428 (e.g., links to web pages mentioning the entity). Interest metrics 460 provide a measure of a level of interest of an entity 428. In some implementations, the metrics 460 are determined by the search analysis module 146. In some implementations, the interest metrics include both historical and real-time levels of interest. References to moments 462 indicate references to media content moments 256 associated with the entity 428. References to polls 464 indicate references to media content polls 258 associated with the entity 428.

Figure 5A:
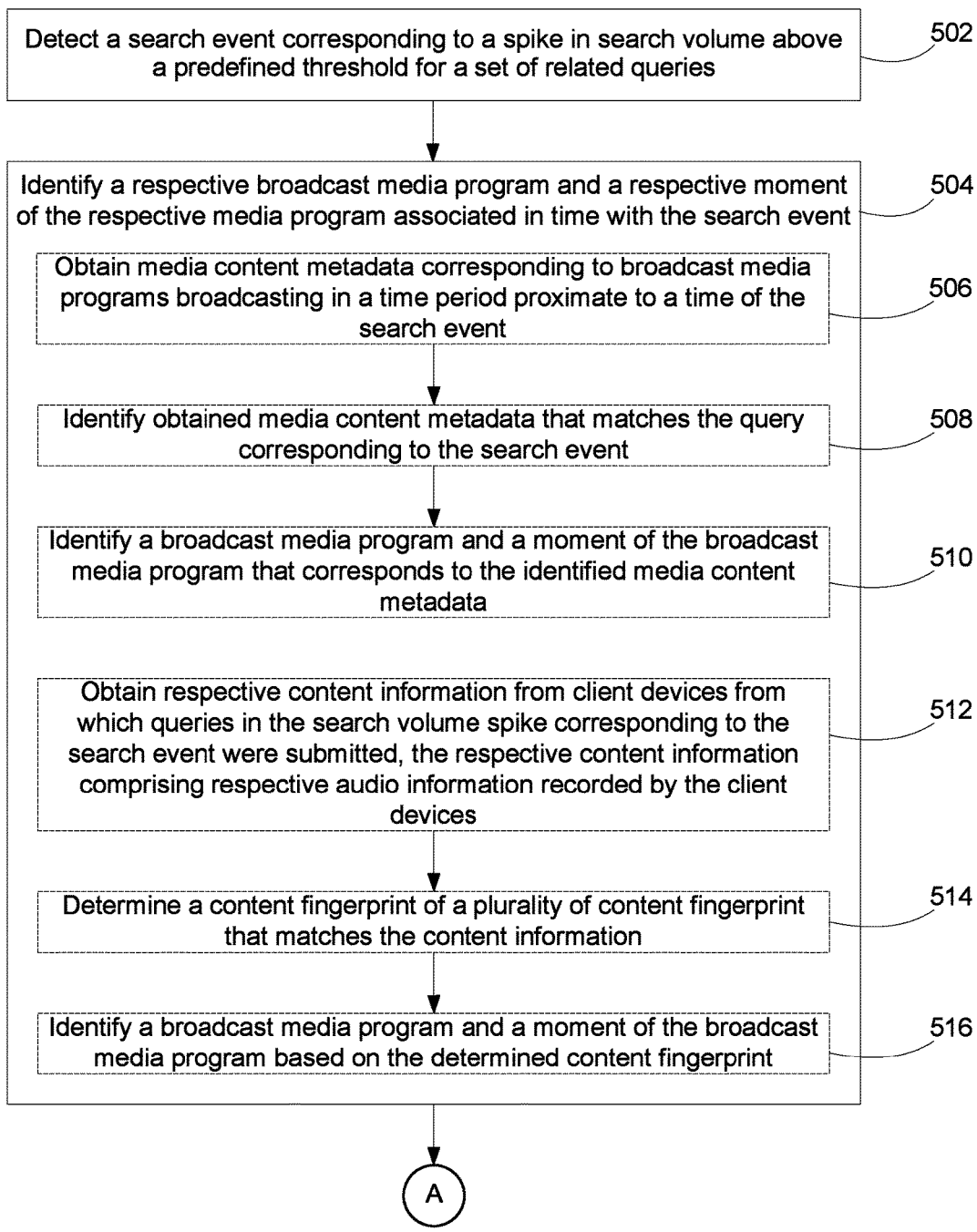
FIGS. 5A-5B are flow diagrams illustrating a method of identifying and presenting media content moments according to some implementations.
Figure 5B:
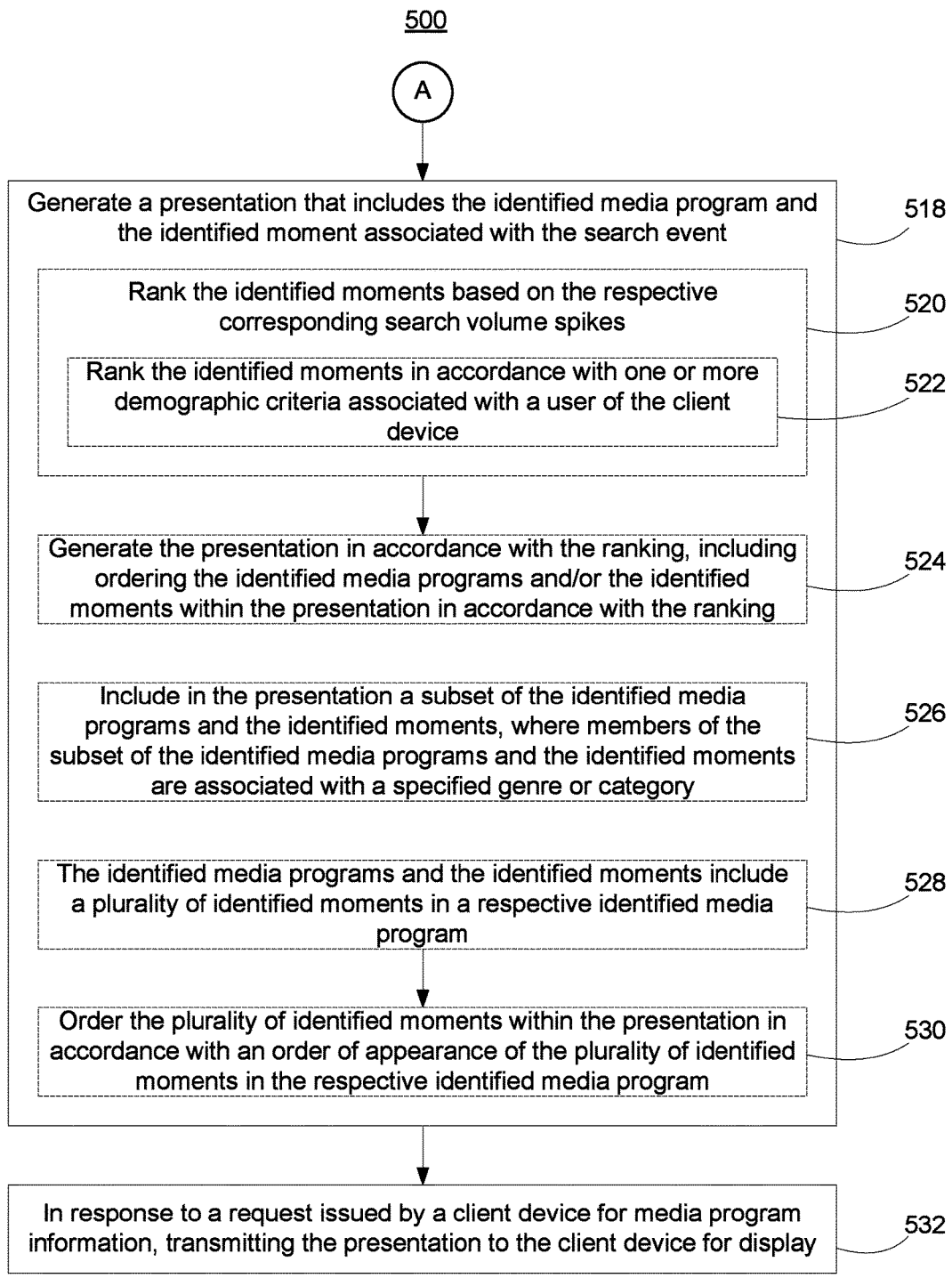

FIGS. 5A-5B illustrate a method 500 of identifying and presenting media content moments, in accordance with some implementations. In some implementations, the method is performed at a computer system (e.g., server 106) having one or more processors and memory storing one or more programs for execution by the one or more processors, where the one or more programs include instructions for performing the method. In some implementations, the one or more programs are stored in a non-transitory computer readable storage medium; the memory is a non-transitory computer readable storage medium.

The computer system detects (502) a search event corresponding to a spike in search volume above a predefined threshold for a set of related queries. The server system 106 (e.g., search analysis module 146) receives and analyzes search data 174 from search engine(s) 172 to determine search volumes for respective search queries and for sets of related queries. In some implementations, the search analysis module 146 identifies related queries based on, for example, common keywords in the queries, and clusters the related queries into a group. For example, as users submit search queries to the search engine 172, their search queries are logged in the search data 174. The search data 174 is analyzed by the search analysis module 146. In some implementations, the search analysis module 146 performs a Bayesian analysis of the search data 174 to identify the search volume spikes. In some implementations, the analyzing of the search data 174 includes correlating search events with users of particular demographic characteristics (e.g., determining which search events are popular with particular demographic groups).

The search analysis module 146 identifies search volume spikes in respective queries and/or sets of related queries, and the times or time ranges when the spikes occur. In some implementations, a search volume spike is an increase in search volume, over a relatively short time span (e.g., an hour, a day, etc.), above a predefined threshold or by a predefined threshold percentage; the spike is a sudden increase in search volume within a relatively short time. In some implementations, the amount or percentage of search volume increase is based on an average or baseline search volume for the respective query or set of queries. The average or baseline may be the average or baseline over a predefined time range (e.g., the past year to date, the past two years to date, etc.). The search analysis module 106 detects a spike of a query or a set of related queries as a search event with a date (or date range) and time (or time range). In some implementations, the baseline or spike is dependent on the context. For example, a search for a product mentioned for the first time on a reality television program may have no or very few searches as its baseline (because it is previously relatively unknown) and then spikes sharply after the mention on the reality television program. This indicates that users were interested in the product, and that the corresponding mention on the reality television program may be identified as a moment, despite a low actual search volume. As another example, searches for a well-known and notorious celebrity may have a consistently high baseline, and thus even a small spike can reflect interest in a moment of interest related to the celebrity.

In some implementations, the server system 106 also determines scores or metrics (e.g., levels of interest) for identified search events and optionally ranks identified search events based on the scores or metrics. In some implementations, an interest level score may be determined for search events based on one or more criteria, including but not limited to the actual volume of the search event, the percentage increase in volume of the search event over a baseline, and a duration of the search event.

The computer system identifies (504) a respective broadcast media program and a respective moment of the respective media program associated in time with the search event. The server system 106 (e.g., the moments module 148) compares the search queries in a search event with media content information from the content database 120 (e.g., subtitles data, content metadata, broadcast dates and times) to identify a media content item associated with the search event. In some implementations, the server system 106 compares media content information to data corresponding to the search event (e.g., search keywords, date and time of the search event), and identifies a media content item with content information that best matches the search event data as the media content item associated with the search event. In some implementations, the media content item is a broadcast media program; the broadcast media program may be distributed over the air or through cable, satellite, or the Internet (e.g., distributed by media content system 112 or video content hosts 176).

The server system 106 identifies as associated with the search event a media program that is associated in time with the search event (and has media content information matching the data corresponding to the search event). In some implementations, a search event is considered associated in time with media content item if the search event occurs within a predefined amount of time (e.g., an hour, two hours, a day, three days, etc.) from the broadcast of the media content item.

The server system 106 also uses the comparing of the media content information to the search event data to identify a position in or a portion of the associated media content item as a moment in the associated media content item. In some implementations, the server system 106 identifies a position in or portion of the associated media content item that is associated in time with or proximate in time from (e.g., within a predefined time range) the search event. For example, for an hour-long broadcast media program that is being broadcast during the 7:00 PM hour on a certain day, if an associated search event has a time of 7:28 PM on the same day, a position or portion of the media program shown around 7:28 PM that day may be identified as a moment in the broadcast media program. In some implementations, the server system 106 identifies a position in or portion of the associated media content item that corresponds to content information that matches the data for the search event (e.g., subtitle text at the position or in the portion matches search keywords corresponding to the search event).

The server system 106 identifies respective associated media content items for respective search events identified by the search analysis module 146. In some implementations, for a respective search event, the server system 106 may identify multiple moments in the associated media content item. In some implementations, the server system 106 may identify respective moments for respective search events associated with the same media content item.

In some implementations, the server system 106 also determines scores or metrics (e.g., levels of interest) for identified moments and optionally ranks identified moments based on the scores or metrics. In some implementations, an interest level score may be determined for moments based on the interest levels for their corresponding search events.

In some implementations, the server system 106 also determines scores or metrics for media content items or media programs based on the identified moments associated with the respective media content items. For example, TV shows may be scored and ranked by how many identified moments they respectively have, by the quality of their respective identified moments (e.g., the scores of their respective identified moments), or a combination of the above (e.g., a weighted score that weighs number of moments with one weight and quality of moments with another weight).

In some implementations, identifying a respective broadcast media program and a respective moment of the respective media program associated in time with the search event includes obtaining (506) media content metadata corresponding to broadcast media programs broadcasting in a time period proximate to a time of the search event, identifying (508) obtained media content metadata that matches the query corresponding to the search event, and identifying (510) a broadcast media program and a moment of the broadcast media program that corresponds to the identified media content metadata. The server system 106 obtains media content metadata from the media content system 112 and/or video content hosts 176 periodically, on a schedule, or as needed, and stores the metadata in the content/fingerprint database 120. The server system 106 may access the metadata stored in the content/fingerprint database 120 and/or the entities database 122, or if the metadata is not already in the content/fingerprint database 120 and/or the entities database 122, obtain the metadata from the media content system 112 and/or video content hosts 176. The obtained metadata includes metadata for media programs broadcast or to be broadcast in accordance with a schedule. Based on the schedule, the server system 106 can identify the media programs broadcast around a particular time (e.g., the time of the search event) and the corresponding metadata. The server system 106 compares the metadata corresponding to the media programs broadcast around the particular time to the data corresponding to the search event (e.g., the search keywords) to identify the broadcast media program with metadata that matches the search keywords. For example, if the search keywords include the title words of a media program, the media program whose title in the metadata matches the title words in the search keywords is identified as the media program associated with the search event. The server system 106 also proceeds to identify one or more moments in the identified media program associated with the search event.

In some implementations, the media content metadata include one or more of: subtitles data, and program guide data (e.g., electronic program guide ("EPG") data). The server system 106 obtains media content metadata from the media content system 112 and/or video content hosts 176, and stores the media content metadata in the content/fingerprint database 120.

In some implementations, identifying a respective broadcast media program and a respective moment of the respective media program associated in time with the search event includes obtaining (512) respective content information from client devices from which queries in the search volume spike corresponding to the search event were submitted, where the respective content information includes respective audio information recorded by the client devices; determining (514) a content fingerprint of a plurality of content fingerprint that matches the content information; and identifying (516) a broadcast media program and a moment of the broadcast media program based on the determined content fingerprint. In some implementations, where the search engine is a part of the server system 106, client devices 102 and/or 140 of users may gather content information as the users of these devices submit search queries. For example, as the users are submitting searches to the search engine 172 via applications 127 while watching a media program, audio from the media program is captured by the client devices (e.g., device 140). Content information (e.g., content fingerprints with a portion from the captured audio) is generated by the client devices from the captured audio and sent to the server system 106. The server system 106 uses the content information identify a media program the users were watching while or shortly before the users submitted their search queries; the identified media program is one that matches the content information (e.g., the fingerprint in the content information matches the fingerprint for the media program). The server system 106 also uses the content information to identify a position or portion of the identified media program as a moment in the media program.

The computer system generates (518) a presentation that includes the identified media program and the identified moment associated with the search event. The server system 106 (e.g., the moments module 148) generates a guide, listing, or the like (collectively referred to as "guide" below) of moments in media content (e.g., broadcast media programs). In some implementations, the server system 106 generates guides periodically or on a schedule (e.g., daily, weekly). In some implementations, the server system 106 generates guides in response to a request, further details of which are described below.

In some implementations, the moments guide lists moments by the corresponding media content item or media program. For example, a moments guide may list one or more media programs, and within the entry or item for each respective media program list identified moments for that media program.

In some implementations, the server system 106 imposes one or more limiting or filtering criteria on the generation of a guide in order to better target the guide. For example, the limiting criterion may be a particular time frame; the server system 106 generates a guide for each day, each week, and/or each month, in order to present moments for the respective day, week, or month. As another example, the limiting criterion is genre or category; the server system 106 generates guides for particular genres or categories (e.g., guides for moments in sports media content, moments in drama media content, moments in comedy media content). As a further example, the limiting criterion is channel or network; the server system 106 generates guides for particular channels (e.g., moments in media content shown on a particular broadcast or cable network). As a further example, the limiting criterion is a particular show or program; the server system 106 generates guides for a particular show or program (e.g., the entirety of the show, a particular season of the show, or a particular episode of the show). As a further example, the limiting criterion is a particular entity; the server system 106 may generate a guide for moments featuring a particular entity (e.g., a particular actor, a particular character).

The server system 106 includes one or more identified moments in the generated moments guide. In some implementations, the moments included in the guide are moments that are ranked highest in interest level among those that satisfy the limiting criteria for the guide to be generated.

In response to a request issued by a client device for media program information, the computer system transmits (532) the presentation to the client device for display. The server system 106 transmits a generated moments guide to a client device (e.g., client device 102 or 140) for display in response to a request from the client device. The request may be automatically generated at the client device by an application 127 (e.g., assistant application 127-3) in accordance with a schedule (e.g., request a guide at 12 AM daily) or at startup. In some implementations, the client device may request a moments guide for a specified genre/category or entity (e.g., automatically in accordance with preferences 249, in response to user command). In some implementations, a moments guide may be requested automatically after the user completed watching a long-form media content item (e.g., a movie). In some implementations, certain search queries submitted by the user from the client device to a search engine 172 associated with the server system 106 may be interpreted as a request for a moments guide. For example, if the user's search query is "yesterday TV highlights," the server system 106 may transmit a moments guide for yesterday's television media programs to the user's client device for display. As another example, if the user's search query is "fc barcelona highlights," the server system 106 may generate a moments guide for moments associated with the soccer club FC Barcelona. In some implementations, the user may request a moments guide from a client device 102 or 140 by activating an affordance configured to request a moments guide in an application 127 (e.g., a button or link to request for TV moments or highlights).

In some implementations, the request may be a request for information related to the respective media program or a general request for a guide of high-interest moments. In some implementations, moments information may be displayed in a mobile device (e.g., in an assistant application 127-3 on a mobile device), a web browser, or in a user interface of a set-top box.

In some implementations, the presentation includes respective links to the identified media programs. The moments guide may include, for each media content item or media program listed, or for each moment listed, a link to information corresponding to the media program where the moment is found.

In some implementations, a respective link to a respective identified media program links to a video streaming service. The information corresponding to the media program where the moment is found may be a presentation of the media program; the link to the corresponding media program is to a video streaming service where that media program is available for consumption via streaming.

In some implementations, a respective link to a respective identified media program links to an official site associated with the respective identified media program. The information corresponding to the media program where the moment is found may be additional information about to the media program provided by an official source of the media program (e.g., the distributor, the producer, etc.).

In some implementations, the presentation includes a respective link to a respective identified moment. The information corresponding to the media program where the moment is found may be a presentation of the portion of media program that corresponds to the moment; the link to the corresponding media program is to a video of the portion corresponding to the moment.

In some implementations, the generating and transmitting are responsive to a request from the client device for a media program guide. The client device may request, for example, a moments guide for a specified genre/category or a particular entity. The server system 106 may generate and transmit a moments guide for the specified genre/category/entity in response to the request from the client device.

In some implementations, the generating and transmitting are responsive to a search query from the client device. The client device may submit a query to the search engine 172 for content suggestive of an interest in media content moments associated with a specified genre, category, or entity (e.g., "fc barcelona highlights"). The server system 106 generates a moments guide tailored to the specified genre, category, or entity, and transmits the guide to the client device.

In some implementations, generating a presentation of the identified media programs and the identified moments associated with the search events includes ranking (520) the identified moments based on the respective corresponding search volume spikes, and generating (524) the presentation in accordance with the ranking, including ordering the identified media programs and/or the identified moments within the presentation in accordance with the ranking. The server system 106 determines scores for, and ranks, moments based on the corresponding search events. The server system 106 may generate a moments guide that orders the moments and/or the corresponding media programs within the guide based on the ranking.

In some implementations, ranking the identified moments based on the respective corresponding search volume spikes includes ranking (522) the identified moments in accordance with one or more demographic criteria associated with a user of the client device. The server system 106 may correlate search events with demographic characteristics, and thus can determine score or metrics for the search events and corresponding moments in view of the demographic characteristics. The server system 106 can thus generate a moments guide to tailor the guide to the user's demographic information 244 (e.g., scoring and ranking higher moments correlated with the user's demographic characteristics).

In some implementations, the one or more criteria associated with a user of the client device include one or more of: age, gender, ethnicity, geographic region, education level, income level, and media consumption preferences.

In some implementations, generating a presentation of the identified media programs and the identified moments associated with the search events includes including (526) in the presentation a subset of the identified media programs and the identified moments, where members of the subset of the identified media programs and the identified moments are associated with a specified genre or category. The server system 106 may generate a moments guide where the moments included in the guide, and the corresponding media content or media programs, are limited or filtered to moments in media content items or media programs of a particular genre or category.

In some implementations, the identified media programs and the identified moments include a plurality of identified moments in a respective identified media program (528), and generating a presentation of the identified media programs and the identified moments includes ordering (530) the plurality of identified moments within the presentation in accordance with an order of appearance of the plurality of identified moments in the respective identified media program. When multiple moments in the same media program are included in the moments guide, the server system 106 may order the moments in the same media program in the order of their positions within the media program (e.g., the earlier moment in the media program are listed first relative to other moments in the same media program).

In some implementations, the server system 106 may identify moments and generate moments guides that are personalized to the user. The server system 106 may, in accordance with user preferences 249 and other user information 240, rank moments that are in accord with the user's preferences or interests higher, and limit moments guides to moments that are ranked high in accordance with the user's preferences or interests.

In some implementations, a moments guide is generated to include images for one or more of the identified moments included in the guide (e.g., stills from the video of the respective moment, official images provided by the network or producer, images matched to news articles related to the moment, etc.).

Figure 6A:
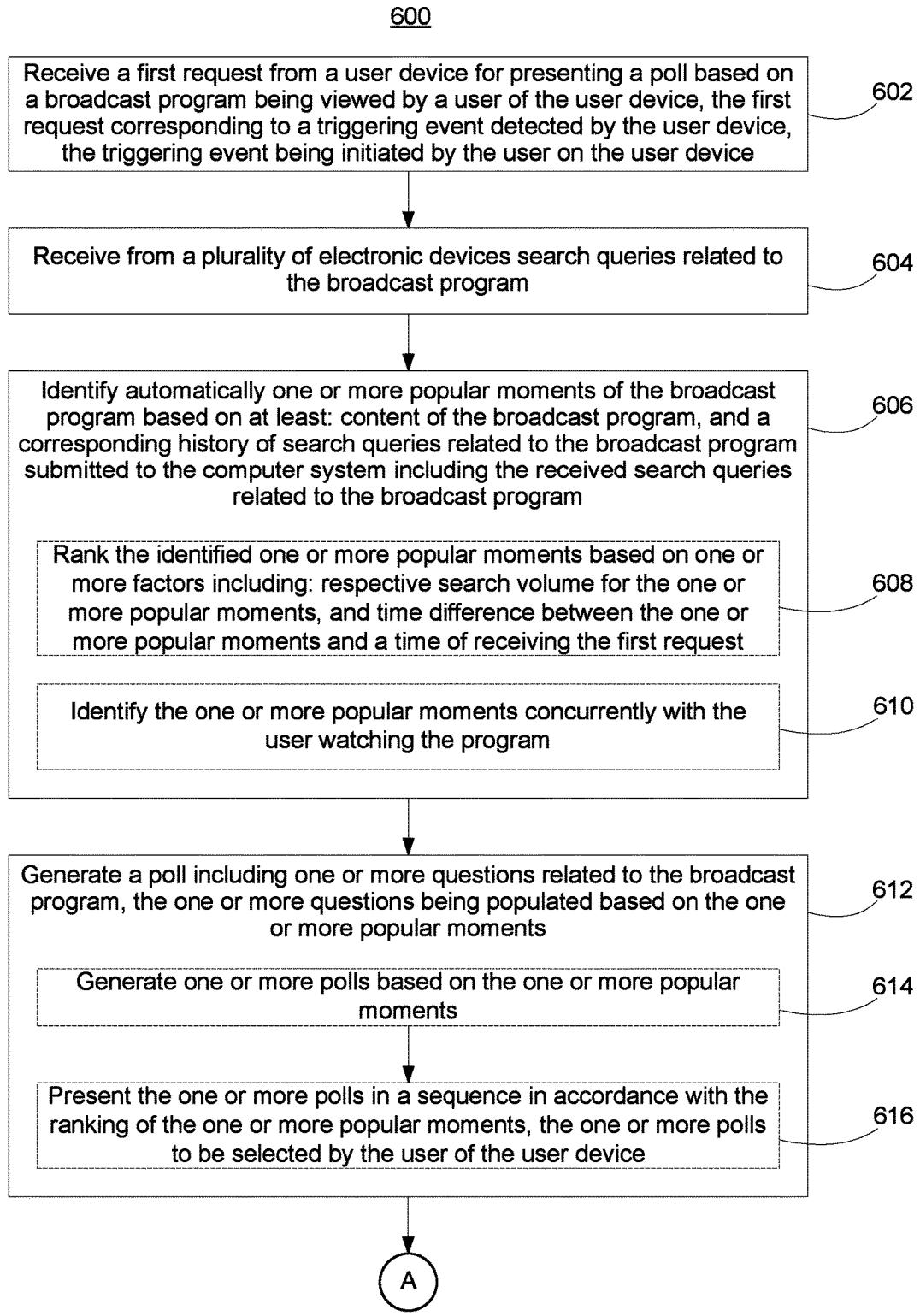
FIGS. 6A-6B are flow diagrams illustrating a method of generating polls for media content moments according to some implementations.
Figure 6B:
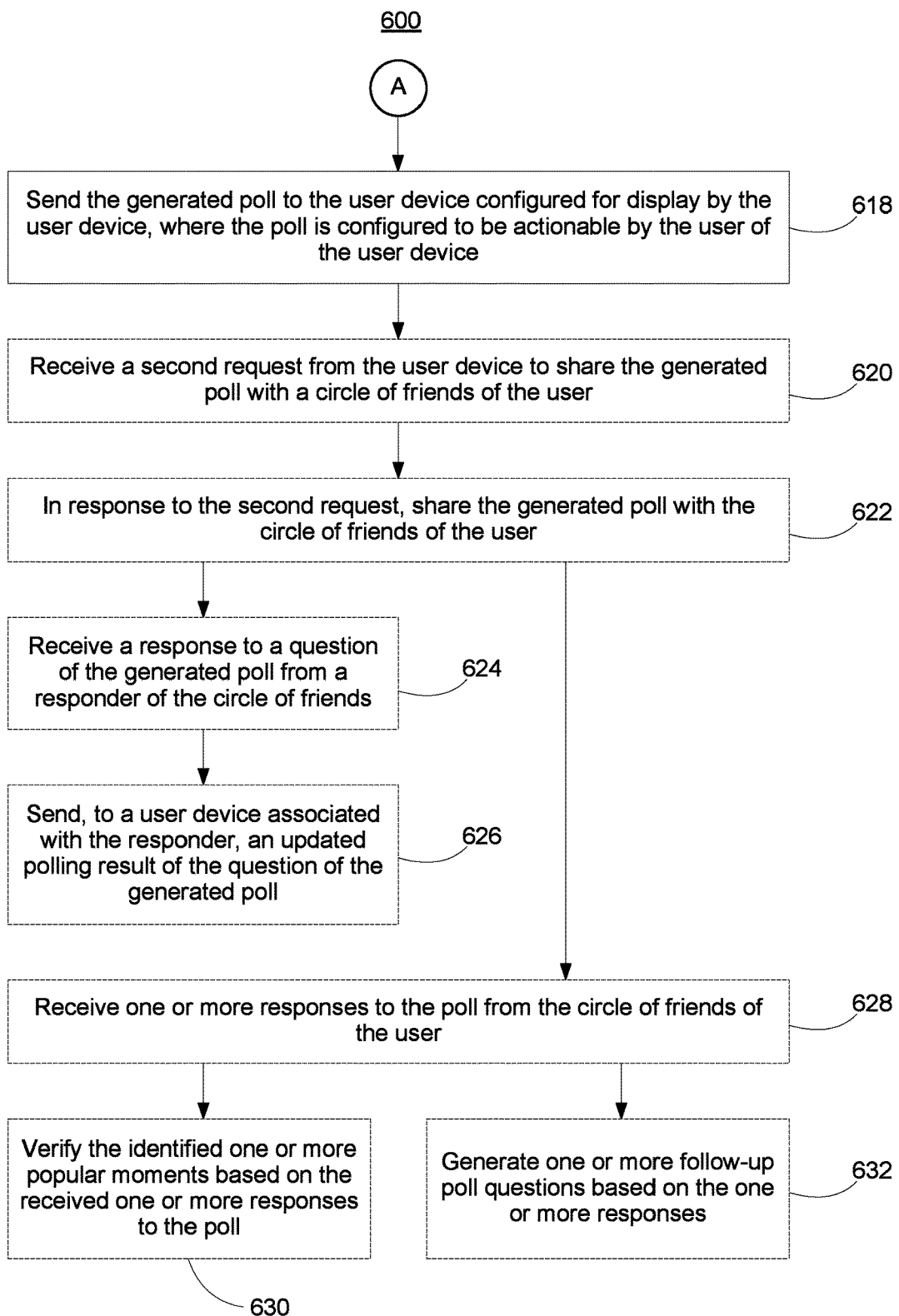

FIGS. 6A-6B illustrate a method 600 of generating polls for media content moments, in accordance with some implementations. In some implementations, the method is performed at a computer system (e.g., server 106) having one or more processors and memory storing one or more programs for execution by the one or more processors, where the one or more programs include instructions for performing the method. In some implementations, the one or more programs are stored in a non-transitory computer readable storage medium; the memory is a non-transitory computer readable storage medium.

The computer system receives (602) a first request from a user device for presenting a poll based on a broadcast program being viewed by a user of the user device, the first request corresponding to a triggering event detected by the user device, the triggering event being initiated by the user on the user device. The server system 106 receives a request from a user device (e.g., client device 102 or 140) for a poll. The request corresponds to a triggering event that is initiated by the user at the client device 102/140 and detected by the client device 102/140. The triggering event may be, for example, the user selecting an affordance to request a poll in an application 127 or the user issuing a verbal request for a poll to the client device 102/140.

The poll is to be based on a media content item or media program being viewed by the user. In some implementations, the media content item (e.g., media content item 126) is being output (e.g., displayed) by a client device (e.g., client device 102) when the user initiated the request, and content from the media content item 126 output (e.g., the audio) is captured by another client device (e.g., client device 140), which generates content information based on the captured output and sends the captured output to the server system 106.

The computer system receives (604) from a plurality of electronic devices search queries related to the broadcast program. The search engine 172 receives multiple search queries related to the media content item 126, and the queries are logged in the search data 174. At least some of the search queries are prior to the triggering event initiated by the user.

The computer system identifies (606) automatically one or more popular moments of the broadcast program based on at least: content of the broadcast program, and a corresponding history of search queries related to the broadcast program submitted to the computer system including the received search queries related to the broadcast program. The server system 106 identifies one or more popular moments (e.g., moments that have high interest levels as determined by the server system 106) based on the content of the program and queries related to the program as logged in search data 174. As described above with reference to FIGS. 5A-5B, the server system 106 analyzes the search data 174 to identify search events from the search queries, determines which search event is associated with or related to the media content item 126, and identifies moments in the media content item 126 that are proximate in time to the search events related to the media content item 126. The identification of the moments utilizes content (e.g., content information with the captured audio) from the media content item 126. Identification of moments are further described above with reference to FIGS. 5A-5B.

The computer system generates (612) a poll including one or more questions related to the broadcast program, the one or more questions being populated based on the one or more popular moments. The server system 106 (e.g., the polling module 150) automatically generates a poll for an identified moment of the media content item 126. The pool may include multiple questions or one question with multiple options (e.g., multiple-choice). The question is generated based on the particular moment. For example, if the moment is a controversial red card given in a soccer game broadcast, the poll may be a question of whether the red card is the right call. As another example, if the moment is a cover of a particular song in a music-related program, the poll may be a question of which of multiple covers or renditions of the particular song is the best.

In some implementations, the poll for the moment may already have been generated when the user made the request, in which case the server system 106 may retrieve the already-generated poll from a database or repository (e.g., entities database 122).

The computer system sends (618) the generated poll to the user device configured for display by the user device, where the poll is configured to be actionable by the user of the user device. The server system 106 sends the generated poll to the client device 102/140 for display to the user at the client device. At the client device, the user may perform any of multiple actions with respect to the poll. The user may vote in the poll and/or share the poll with other users (e.g., via a social network). In some implementations, the server system 106 sends multiple polls, associated with respective moments in the media content item 126, to the client device, and the user may perform actions with respect to any of the multiple polls.

In some implementations, identifying the one or more popular moments of the broadcast program includes ranking (608) the identified one or more popular moments based on one or more factors including: respective search volume for the one or more popular moments, and time difference between the one or more popular moments and a time of receiving the first request; and generating the poll includes generating (614) one or more polls based on the one or more popular moments, and presenting (616) the one or more polls in a sequence in accordance with the ranking of the one or more popular moments, the one or more polls to be selected by the user of the user device. As described above, the server system 106 may rank the identified moments. The ranking may be based on rankings of the corresponding search events, which in turn may be based on the corresponding search volumes. The server system 106 may also rank the moments based on how close in time the moment is to the user's request for the poll, with the smaller time difference leading to a higher ranking. The polling module 150 generates multiple polls based on the identified moments, and arranges the polls in an order based on the rankings of the corresponding moments.

In some implementations, identifying the one or more popular moments includes identifying (610) the one or more popular moments concurrently with the user watching the program. The server system 106 may identify the moments as the media content item 126 is being output by the client device 102.

In some implementations, the generating the poll is in response to and proximate in time with receiving the first request from the user device. The server system 106 may generate the poll in response to, and soon after, the user request for the poll.

In some implementations, the computer system receives (620) a second request from the user device to share the generated poll with a circle of friends of the user, and in response to the second request, shares (622) the generated poll with the circle of friends of the user. The user may issue a request to share the poll with a circle of friends on a social network (e.g., by activating an affordance to share the poll). The server system 106 receives the request, and in response, shared the poll with the circle of friends via the social network, if the server system 106 has the user's account information for the social network in the user database 130.

In some implementations, the computer system receives (624) a response to a question of the generated poll from a responder of the circle of friends, and sends (626), to a user device associated with the responder, an updated polling result of the question of the generated poll. When any of the friends to whom the poll was shared votes in the poll, server system 106 may send the updated results of the poll to a client device of that friend.

In some implementations, the computer system receives (628) one or more responses to the poll from the circle of friends of the user, and verifies (630) the identified one or more popular moments based on the received one or more responses to the poll. The server system 106 may use the responses from the friends to whom the poll is shared to verify whether an identified moment should be kept as a moment or removed, or whether the score or ranking of the moment should be changed (e.g., low response rate suggests less interest in a moment).

In some implementations, the computer system receives (628) one or more responses to the poll from the circle of friends of the user, and generates (632) one or more follow-up poll questions based on the one or more responses. The server system 106 may generate additional poll related to the shared poll based on the responses received from the friends to whom the poll was shared. For example, if the original poll was about whether a particular red card given in a soccer game was correct and the majority of the friends' responses are that the red card was correct, a follow-up question may be a question regarding how many games the offending player should be suspended for the red card.

In some implementations, a poll is generated by the computer system to include multimedia content in addition to the textual content (i.e., the question and the response options). For example, the poll may include images (e.g., movie poster art, actor photos), video (e.g., trailer, promotional video clip), audio, or the like. Images may be licensed images (e.g., official artwork) or matches to open source equivalents. Video or imagery may be taken from scenes in the media content item (e.g. a video of a football player about to kick a goal, an image of a singing contestant before the judges respond to the contestant's performance, etc.).

In some implementations, the computer system generates a poll for a media program based on the keywords used in the search queries corresponding to the search spike associated with the media content. For example, if the singer Madonna appears in a TV program, and the computer system detects a search spike for the search query "madonna age," then the computer system may generate a poll that has a question based on one or more keywords from the search query, such as "Guess Madonna's age." The computer system may also use, in addition to the search query keywords, EPG data and/or information obtained from processing the live content of the media program to generate the poll.

In some implementations, the computer system generates a poll for a media program based on EPG data and processing of live content of the media program. For example, if the computer system detects that a media program is a music contest (based on EPG data), and then determines, based on processing of the live on-screen text and subtitles data of the media program, that a contestant just finished performing a song, then the computer system may generate a poll based on the detection of the media program being a music contest and the detection of the contestant finishing a performance, e.g., a poll that asks a question like "How was X's performance?" In this case, generating the poll does not require detection of a search spike associated with the media program.

In some implementations, the computer system generates a poll for media content based on EPG data. For example, the computer system may detect, based on EPG data, a sporting event in the television programming schedule. The computer system can determine the teams playing in the sporting event from the EPG data and generate a poll at the beginning of the scheduled time for the sporting event program. This poll may ask, for example, "Who is your favorite to win?", "Who do you think will win?", or the like, with the answer choices being the teams playing in the sporting event. In this case, generating the poll does not require detection of a search spike associated with the media program or process of live content of the media program.

Figure 7:
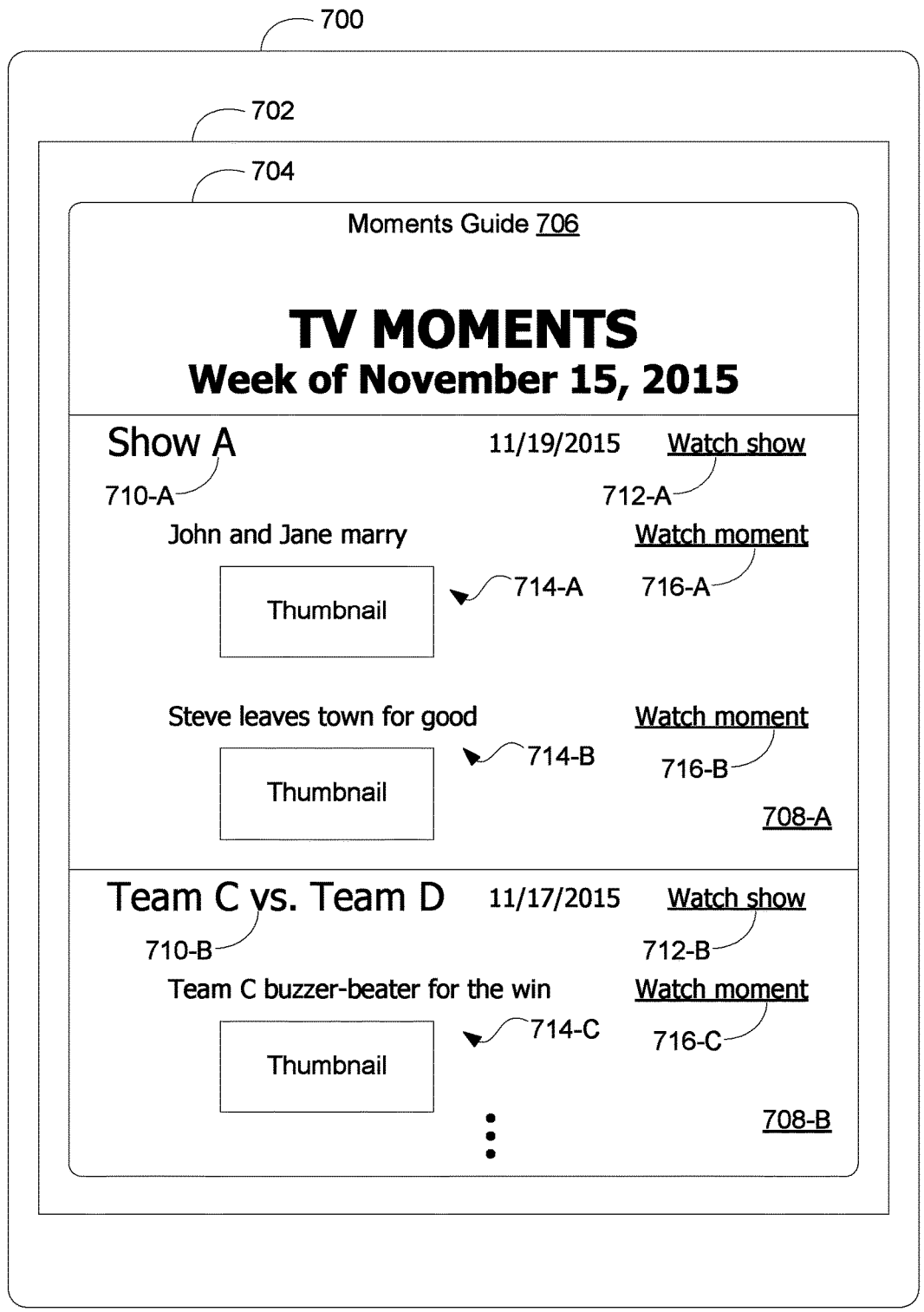
FIG. 7 illustrates an example user interface diagram for a moments guide according to some implementations.

FIG. 7 illustrate an example user interface for a moments guide in accordance with some implementations. It should be appreciated that the user interface illustrated in FIG. 7 is merely exemplary, and variations are possible.

FIG. 7 illustrates a client device 700 (e.g., client device 140, FIG. 3B) with a display 702 (e.g., display 343). Within the display 702 is displayed a user interface 704 for an assistant application (e.g., assistant application 127-3). At an appropriate time (e.g., at a scheduled time), the assistant application, if running and active, requests a moments guide from the server system 106 and displays the moments guide 706 in the user interface 704.

The moments guide 706 includes a title describing the guide ("TV Moments"), a date range of the guide ("Week of Nov. 15, 2015"), and one or more media program entries 708. Within each media program entry are a name or title 710 of the media program, a link 712 to watch the media program (e.g., link to video of the media program), one or more identified moments 714 (with description and optionally a frame thumbnail from the media program), and corresponding links 716 to watch the particular moment (e.g., link to video of the moment).

Thus, for example, media program entry 708-A is for a media program named "Show A" 710-A and includes a link 712-A to watch "Show A" (e.g., the entirety of the particular episode where the moments are found). Entry 708-A includes moments 714-A and 714-B. Each of these moments include respective links 716-A and 716-B for watching the respective moment.

Media program entry 708-B is for a media program named "Team C vs. Team D" 710-B and includes a link 712-B to watch "Team C vs. Team D.". Entry 708-B includes a moment 714-C, which includes a link 716-C for watching the moment 714-C.

Figure 8B:
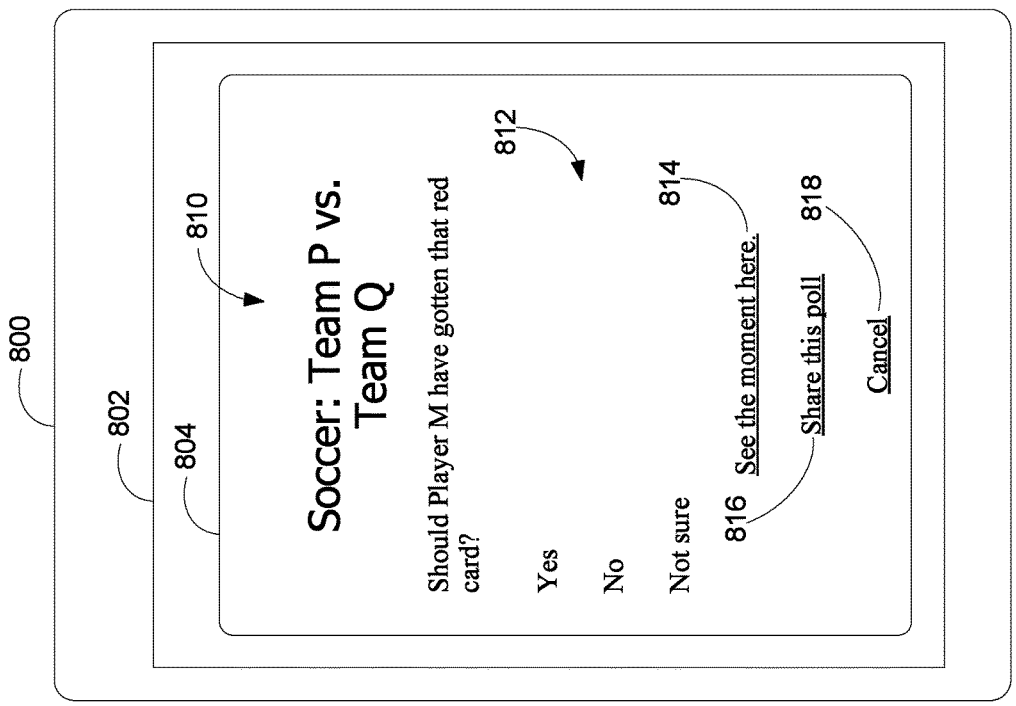
FIGS. 8A-8B illustrate example user interface diagrams for a poll for a media content moment according to some implementations.
Figure 8A:
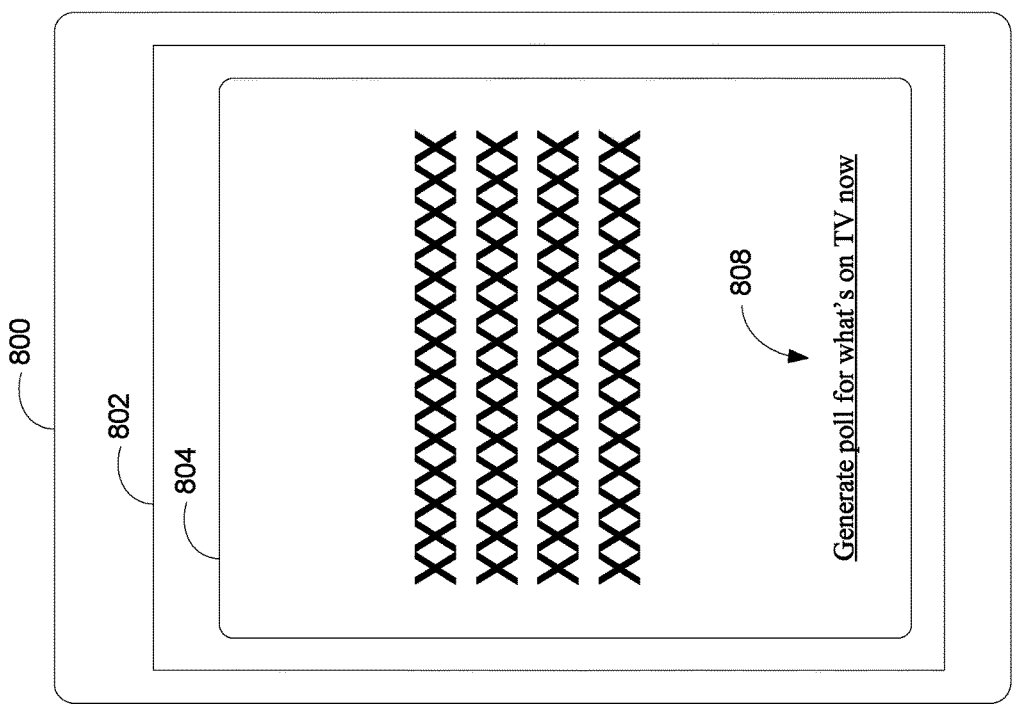

FIGS. 8A-8B illustrate example user interfaces for a poll for a media content moment in accordance with some implementations. It should be appreciated that the user interfaces illustrated in FIGS. 8A-8B are merely exemplary, and variations are possible.

FIG. 8A illustrates a client device 800 (e.g., client device 140, FIG. 3B) with a display 802 (e.g., display 343). Within the display 802 is displayed a user interface 804 for an assistant application (e.g., assistant application 127-3). As a user of the client device 800 is watching or listening to media content being played on a device (e.g., on client device 102), the assistant application 804, can capture audio output from the playing media content and receive requests to generate a poll for what the media content.

Interface 804 includes an affordance 808 for requesting a poll for the playing media content. In response to user activation of the affordance 808, the assistant application captures audio from the playing media content and sends the request along with content information corresponding to the playing media content (e.g., the captured audio) to the server system 106. The server system 106 receives the request for the poll, identifies the moment that best matches the position in the playing media content around the time of the poll request, and generates a poll for that moment (or retrieves the poll if already generated). The server system 106 sends the poll to the client device 800.

FIG. 8B illustrates a user interface 810 for displaying the poll 812 received from the server system 106. The user interface 810 includes a name or title of the media content for which the user requested a poll ("Soccer: Team P vs. Team Q"), the poll 812 with a question (e.g., "Should Player M have gotten that red card?") and multiple possible answers or responses or options (e.g., "Yes," "No," and "Not sure"), an affordance 814 (e.g., a link) to watch the moment corresponding to the poll, an affordance 816 to share the poll with one or more other users (e.g., to friends in a social network), and affordance 818 to cancel the user interface 810 and return to a previous user interface. In some implementations, if multiple polls have been received by the client device 800, the user may dismiss the poll 812 (e.g., by swiping) to have another poll associated with the media content displayed in the user interface 810 (e.g., a poll corresponding to another moment within the "Soccer: Team P vs. Team Q" media content item).

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Reference will now be made in detail to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:
   at a computer system including one or more processors and memory storing programs for execution by the one or more processors:
      receiving a first request from a user device for presenting a poll based on a broadcast program being viewed by a user of the user device, the first request corresponding to a triggering event detected by the user device, the triggering event being initiated by the user on the user device;

receiving from a plurality of electronic devices search queries related to the broadcast program;

identifying automatically one or more popular moments of the broadcast program by:

comparing content of the broadcast program and a corresponding history of search queries related to the broadcast program submitted to the computer system including the received search queries related to the broadcast program; and ranking the one or more identified popular moments based on a plurality of factors including at least: respective search volume for the one or more popular moments, and time difference between the one or more popular moments and a time of receiving the first request;

generating automatically a poll including a plurality of questions related to the broadcast program, the plurality of questions being populated based on the one or more identified popular moments and in accordance with the ranking; and sending the generated poll to the user device configured for display by the user device, wherein the poll is configured to be actionable by the user of the user device.

2. The method of claim 1, wherein generating the poll comprises:

generating one or more polls based on the one or more popular moments; and presenting the one or more polls in a sequence in accordance with the ranking of the one or more popular moments, the one or more polls to be selected by the user of the user device.

3. The method of claim 1, further comprising:

receiving a second request from the user device to share the generated poll with a circle of friends of the user; and in response to the second request, sharing the generated poll with the circle of friends of the user.

4. The method of claim 3, further comprising:

receiving a response to a question of the generated poll from a responder of the circle of friends; and sending, to a user device associated with the responder, an updated polling result of the question of the generated poll.

5. The method of claim 3, further comprising:

receiving one or more responses to the poll from the circle of friends of the user; and verifying the identified one or more popular moments based on the received one or more responses to the poll.

6. The method of claim 3, further comprising:

receiving one or more responses to the poll from the circle of friends of the user; and generating one or more follow-up poll questions based on the one or more responses.

7. The method of claim 1, wherein identifying the one or more popular moments comprises identifying the one or more popular moments concurrently with the user watching the program.

8. The method of claim 1, wherein generating the poll is in response to and proximate in time with receiving the first request from the user device.

9. A computer system, comprising:

one or more processors;

memory; and one or more programs, wherein the one or more programs are stored in the memory and configured to be executed by the one or more processors, the one or more programs including instructions for:

receiving a first request from a user device for presenting a poll based on a broadcast program being viewed by a user of the user device, the first request corresponding to a triggering event detected by the user device, the triggering event being initiated by the user on the user device;

receiving from a plurality of electronic devices search queries related to the broadcast program;

identifying automatically one or more popular moments of the broadcast program by:

comparing content of the broadcast program and a corresponding history of search queries related to the broadcast program submitted to the computer system including the received search queries related to the broadcast program; and ranking the identified one or more popular moments based on a plurality of factors including at least: respective search volume for the one or more popular moments, and time difference between the one or more popular moments and a time of receiving the first request;

generating automatically a poll including a plurality of questions related to the broadcast program, the plurality of questions being populated based on the one or more identified popular moments and in accordance with the ranking; and sending the generated poll to the user device configured for display by the user device, wherein the poll is configured to be actionable by the user of the user device.

10. The computer system of claim 9, wherein the instructions for generating the poll comprise instructions for:

generating one or more polls based on the one or more popular moments; and presenting the one or more polls in a sequence in accordance with the ranking of the one or more popular moments, the one or more polls to be selected by the user of the user device.

11. The computer system of claim 9, further comprising instructions for:

receiving a second request from the user device to share the generated poll with a circle of friends of the user; and in response to the second request, sharing the generated poll with the circle of friends of the user.

12. The computer system of claim 11, further comprising instructions for:

receiving a response to a question of the generated poll from a responder of the circle of friends; and sending, to a user device associated with the responder, an updated polling result of the question of the generated poll.

13. The computer system of claim 11, further comprising instructions for:

receiving one or more responses to the poll from the circle of friends of the user; and verifying the identified one or more popular moments based on the received one or more responses to the poll.

14. The computer system of claim 11, further comprising instructions for:

receiving one or more responses to the poll from the circle of friends of the user; and generating one or more follow-up poll questions based on the one or more responses.

15. The computer system of claim 9, wherein the instructions for identifying the one or more popular moments comprise instructions for identifying the one or more popular moments concurrently with the user watching the program.

16. The computer system of claim 9, wherein generating the poll is in response to and proximate in time with receiving the first request from the user device.

17. A non-transitory computer readable storage medium storing one or more programs, the one or more programs comprising instructions which, when executed by a computer system with one or more processors, cause the computer system to:
- receive a first request from a user device for presenting a poll based on a broadcast program being viewed by a user of the user device, the first request corresponding to a triggering event detected by the user device, the triggering event being initiated by the user on the user device;
- receive from a plurality of electronic devices search queries related to the broadcast program;
- identify automatically one or more popular moments of the broadcast program by:
  - comparing content of the broadcast program and a corresponding history of search queries related to the broadcast program submitted to the computer system including the received search queries related to the broadcast program; and
  - ranking the identified one or more popular moments based on a plurality of factors including at least: respective search volume for the one or more popular moments, and time difference between the one or more popular moments and a time of receiving the first request;
- generate automatically a poll including a plurality of questions related to the broadcast program, the plurality of questions being populated based on the one or more popular moments and in accordance with the ranking; and
- send the generated poll to the user device configured for display by the user device, wherein the poll is configured to be actionable by the user of the user device.

18. The computer readable storage medium of claim 17, wherein
the instructions for generating the poll comprise instructions which, when executed by the computer system, cause the computer system to:
- generate one or more polls based on the one or more popular moments; and
- present the one or more polls in a sequence in accordance with the ranking of the one or more popular moments, the one or more polls to be selected by the user of the user device.

19. The computer readable storage medium of claim 17, further comprising instructions which, when executed by the computer system, cause the computer system to:
- receive a second request from the user device to share the generated poll with a circle of friends of the user; and
- in response to the second request, share the generated poll with the circle of friends of the user.

20. The computer readable storage medium of claim 17, wherein the instructions for identifying the one or more popular moments comprise instructions which, when executed by the computer system, cause the computer system to: identify the one or more popular moments concurrently with the user watching the program.

* * * * *